(12) United States Patent
Imai et al.

(10) Patent No.: US 7,684,417 B2
(45) Date of Patent: Mar. 23, 2010

(54) METHOD OF MIGRATING PROCESSES BETWEEN NETWORKS AND NETWORK SYSTEM THEREOF

(75) Inventors: Tetsuo Imai, Tokyo (JP); Soichiro Araki, Tokyo (JP); Yoshihiko Suemura, Tokyo (JP); Norihito Fujita, Tokyo (JP); Tomoyoshi Sugawara, Tokyo (JP)

(73) Assignee: NEC Corporation, Tokyo (JP)

( * ) Notice: Subject to any disclaimer, the term of this patent is extended or adjusted under 35 U.S.C. 154(b) by 619 days.

(21) Appl. No.: 10/590,355

(22) PCT Filed: Feb. 25, 2005

(86) PCT No.: PCT/JP2005/003147

§ 371 (c)(1),
(2), (4) Date: Dec. 14, 2006

(87) PCT Pub. No.: WO2005/083569

PCT Pub. Date: Sep. 9, 2005

(65) Prior Publication Data

US 2008/0019316 A1 Jan. 24, 2008

(30) Foreign Application Priority Data

Feb. 26, 2004 (JP) ............................. 2004-051751

(51) Int. Cl.
*H04L 12/28* (2006.01)
(52) U.S. Cl. ...................... 370/401; 370/402; 370/410; 370/400; 709/213; 709/224; 709/235; 711/154; 711/161; 711/165
(58) Field of Classification Search ................ 370/400, 370/401, 402, 410; 709/213, 224, 235; 711/154, 711/161, 162, 165
See application file for complete search history.

(56) References Cited

U.S. PATENT DOCUMENTS

| 5,812,751 | A | * | 9/1998 | Ekrot et al. ..................... 714/4 |
| 6,128,657 | A | * | 10/2000 | Okanoya et al. ............. 709/224 |
| 6,598,071 | B1 | * | 7/2003 | Hayashi et al. ............. 709/203 |
| 6,886,086 | B2 | * | 4/2005 | Kobayashi et al. .......... 711/162 |
| 6,910,078 | B1 | * | 6/2005 | Raman et al. ............... 709/231 |

(Continued)

FOREIGN PATENT DOCUMENTS

JP 08-212095 A 8/1996

(Continued)

*Primary Examiner*—Ayaz R Sheikh
*Assistant Examiner*—Andrew C Lee
(74) *Attorney, Agent, or Firm*—Sughrue Mion, PLLC

(57) ABSTRACT

To eliminate interruption of a service used by a user and reset of communication caused by switching of an operating server such as a process migration or the like. On receiving a session migration start request, server/network cooperation control means 2 issues an operating server-switching control start notification to an operating server switching control means 3 (step S702). On receiving the operating server switching control start notification, the operating server switching control means 3 switches an operating server. Next, on receiving an operating server switching control completion notification, the server/network cooperation control means 2 sends a connection destination target network-switching request to a connection control means 4 (step S707). The connection control means 4 switches the connection destination target network of the user corresponding to a user name whose connection destination target network is to be switched, from a target network including a main server to a switch destination target network including a backup server (step S708).

9 Claims, 17 Drawing Sheets

U.S. PATENT DOCUMENTS

| | | | |
|---|---|---|---|
| 7,302,541 B2 * | 11/2007 | Hirezaki et al. | 711/165 |
| 7,383,264 B2 * | 6/2008 | Sutoh et al. | 707/10 |
| 2003/0101275 A1 * | 5/2003 | Maciel | 709/235 |
| 2004/0049553 A1 * | 3/2004 | Iwamura et al. | 709/213 |

FOREIGN PATENT DOCUMENTS

| | | |
|---|---|---|
| JP | 8-329025 A | 12/1996 |
| JP | 08-335198 A | 12/1996 |
| JP | 09-034814 A | 2/1997 |
| JP | 09-091233 A | 4/1997 |
| JP | 10-027148 A | 1/1998 |
| JP | 10-320323 A | 12/1998 |
| JP | 2000-250771 A | 9/2000 |
| JP | 2000-299691 A | 10/2000 |
| JP | 2001-350736 A | 12/2001 |
| JP | 2003-298624 A | 10/2003 |
| JP | 2005-142702 A | 6/2005 |

* cited by examiner

FIG.2 NETWORK FOR STREAMING (BEFORE SESSION MIGRATION)

NETWORK FOR STREAMING
(AFTER SESSION MIGRATION)

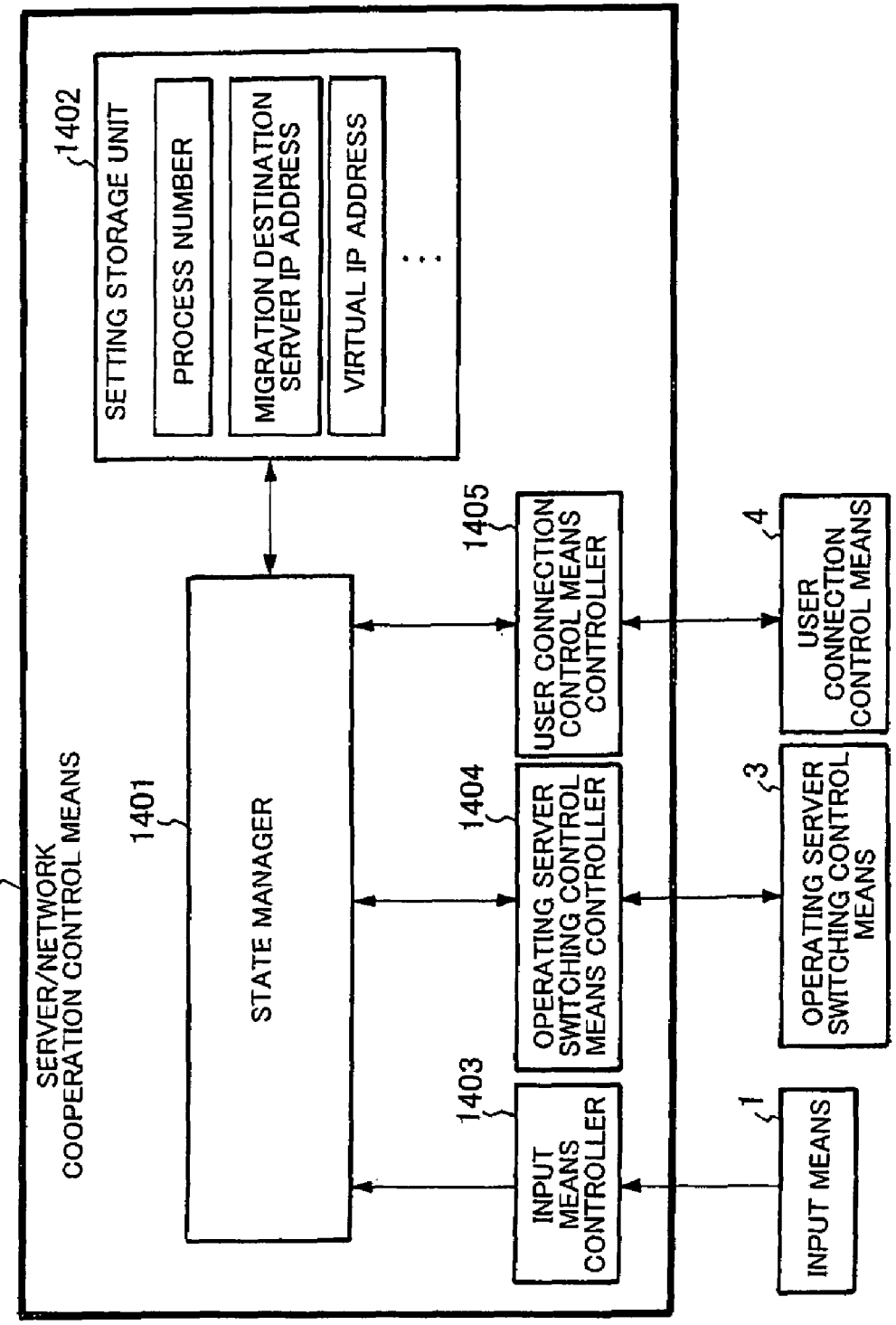

METHOD OF MIGRATING PROCESSES BETWEEN NETWORKS AND NETWORK SYSTEM THEREOF

TECHNICAL FIELD

The present invention relates to a method of migrating a process between networks to migrate the process in a wide area while maintaining the connection between a user and the process in order to minimize a business suspension time when failure occurs in a data center or a server, and to a network system and a program of the method.

In particular, the present invention relates to a method of migrating a process between networks to switch, when an operating server is switched by using a technology for switching the operating server from a main server to a backup server, the connection destination target network of a user, which has accessed the main server, to the backup server in conjunction with the switching of the operating server so that the operating server can be switched while maintaining the communication between the user and the server or between the user and the process, and to a network system and a program of the method.

BACKGROUND ART

When a disaster such as power failure, fire, or the like, by which a data center is affected in its entirety, occurs, a disaster recovery technology is used to enable a user who executes business through a server connected to him from a remote place, to continuously execute the business. A conventional disaster recovery technology (technology for avoiding failure caused by disaster) includes a method of switching an operating server, which provides service, to a remote server by using technology such as a dual operation, a process migration, or the like.

As shown in a patent document 1, the process migration is a technology for migrating a program operating on a computer to another computer while maintaining the executing status of the program and causing the program to be continuously executed in the same status as that in the original computer.

Further, as shown in a patent document 2, there are also known a VLAN switching technology and the like in which a gateway of a user site switches the connection destination VLAN of a user, as a technology for switching the connection destination target network of the user that has accessed to a main server to a backup server and switching an operating server while maintaining a connection between the user and the server or between the user and a process.

Patent documents 3, 5 and 6 disclose technologies for migrating an IP address when a current system is switched to a waiting system in a dual operation arrangement. Further, a patent document 4 discloses a technology in which a client executes communication by converting a connection destination IP address from a virtual IP address to an actual IP address, and, when failure occurs, the actual IP address to be converted is switched from an actual IP address of a current (main) system to an actual IP address of a waiting (backup) system.

Patent document 1: JP-A-08-329025
Patent document 2: JP-2003-375352 (JP-A-2005-142702)
Patent document 3: JP-A-08-335198
Patent document 4: JP-A-09-034814
Patent document 5: JP-A-09-091233
Patent document 6: JP-A-10-320323

DISCLOSURE OF THE INVENTION

Problems to be Solved by the Invention

When an operating server for providing a user with service is switched to a remote server by a disaster recovery technology, the user, which has executed business by being connected to the original server, is required to execute recovery processing for disconnecting the original server, changing a server to be connected and connecting to the changed server again, and the like so that the user is ongoingly provided with the service. During the period of the processing, the service to the user is interrupted.

To continue communication without changing the connection destination identifier of the user even if the operating server is switched, there is a method of migrating a virtual connection destination identifier such as a virtual connection IP address or the like to a migration destination server simultaneously with a process migration. However, as described later, it is ordinarily difficult to share the connection destination identifier such as an IP address or the like between remote servers through a wide area network.

A specific example indicating how it is difficult to share the connection destination identifier between the remote servers through the wide area network will be explained below with reference to FIG. 13.

In FIG. 13, a user machine 1308 is disposed to a user site 1309, a server 1301 is disposed to a main site 1303, and a server 1302 is disposed to a backup site 1304. The main site 1303 has a router 1305 located at the boundary to a wide area Ether network (wide area Ether (registered trade mark) network) 1310, and the backup site 1304 has a router 1306 located at the boundary to it. Accordingly, the servers 1301 and 1302 belong to different LANs, respectively. A user can make communication with the respective servers 1301 and 1302 through a router 1307 of the user site 1309, the wide area Ether network 1310, and the routers 1305 and 1306.

In an ordinary time, the server 1301 acts as an operating server, and the user makes use of service by being connected to the virtual IP address 192.168.2.1 of the server 1301. When disaster occurs, the operating server 1301 is switched from the server 1301 to the server 1302, and, at the same time, the virtual address 192.168.2.1 is shifted from the server 1301 to the server 1302. However, since the contents of the routing tables held by the routers of the respective sites are not switched promptly, there is a disadvantage that the shift of the IP address is not reflected to the network at once (a period of time depends on timing at which the routing tables are updated).

Further, there is a method of disposing a switching destination server in a different network (or in a different virtual network such as a VLAN or the like) to prevent a connection destination identifier from being shared between remote servers through a wide area network. In this case, however, a user must execute processing such as switching of a connection destination network and reconnection to the switched network after an operating server is switched so that the user continuously uses service.

As described above, when an operating server is switched to a sever belonging to a different LAN in a remote place to avoid failure, there is conventionally a disadvantage in that since a user must execute recovery processing, service is interrupted during the time of the recovery processing.

An object of the present invention is to continuously provide service without requiring a user to execute recovery processing even if an operating server is switched to a remote server to avoid failure.

MEANS FOR SOLVING THE PROBLEM

A network system of the present invention comprises:
connection control means for controlling the switching of the connection destination of a terminal;
first and second servers belonging to first and second different networks, respectively and connected to the terminal, respectively through the first and second networks;
operating server-switching control means for migrating a process from the first server to the second server; and
server/network cooperation control means having a storage unit for storing the information of the first and second servers and the information of the second network, and connected to the operating server-switching control means and to the connection control means,
wherein the server/network cooperation control means comprises information processing means for executing processing for receiving a process migration request from the first server to the second server and sending a migration start request including the information of the second server as a migration destination stored in the storage unit to the operating server-switching control means, and processing for receiving a target process migration completion notification from the operating server-switching control means and sending a switching request from the first network to the second network to the connection control means, the switching request including the information of the second network stored in the storage unit.

A process migration method between networks of a network system of the present invention comprises:
connection control means for controlling the switching of the connection destination of a terminal;
first and second servers belonging to first and second different networks, respectively and connected to the terminal, respectively through the first and second networks;
operating server-switching control means for migrating a process from the first server to the second server; and
server/network cooperation control means connected to the operating server-switching control means and to the connection control means,
wherein the process migration method comprises:
a first step at which the server/network cooperation control means receives a process migration request from the first server to the second server, and sends a migration start request including the information of the second server as a migration destination to the operating server-switching control means;
a second step at which the operating server-switching control means migrates a target process from the first server to the second server on receiving the migration start request;
a third step at which the server/network cooperation control means receives a process migration completion notification from the operating server-switching control means and sends a switching request from the first network to the second network to the connection control means, the switching request including the information of the second network; and
a fourth step at which the connection control means switches a target network from the first network to the second network.

A server/network cooperation control device of the present invention is used in a network system, and the network system comprises:
connection control means for controlling the switching of the connection destination of a terminal;
first and second servers belonging to first and second different networks, respectively and connected to the terminal, respectively through the first and second networks; and
operating server-switching control means for migrating a process from the first server to the second server,
wherein the server/network cooperation control device is connected to the operating server-switching control means and the connection control means, and comprises:
a storage unit for storing the information of the first and second servers and the information of the second network; and
information processing means for executing processing for receiving a process migration request from the first server to the second server and sending a migration start request including the information of the second server as a migration destination stored in the storage unit to the operating server-switching control means, and processing for receiving a target process migration completion notification from the operating server-switching control means and sending a switching request from the first network to the second network to the connection control means, the switching request including the information of the second network stored in the storage unit.

A program of a server/network cooperation control computer of the present invention is used in a network system, and the network system comprises:
connection control means for controlling the switching of the connection destination of a terminal;
first and second servers belonging to first and second different networks, respectively and connected to the terminal, respectively through the first and second networks; and
operating server-switching control means for migrating a process from the first server to the second server,
wherein the computer is connected to the operating server-switching control means and the connection control means, and
wherein the program causes the computer to execute:
(1) processing for receiving a process migration request from the first server to the second server and sending a migration start request including the information of the second server as a migration destination stored in a storage unit of the computer to the operating server-switching control means; and
(2) processing for receiving a target process migration completion notification from the operating server-switching control means and sending a switching request from the first network to the second network to the connection control means, the switching request including the information of the second network stored in the storage unit.

In the present invention, when failure is predicted or when an operator issues an instruction, an operating server is switched between servers in different networks across a wide area network without causing a user of a terminal being aware of the switch by executing the control of a connection and the switching control of the operating server in cooperation with each other. Specifically, first, an operating server-switching controller duplicates a process of the server of a main site (hereinafter, referred to as main server) to the server of a backup site (hereinafter, referred to as backup server) and shifts a shiftable identifier showing a connection destination such as the virtual IP address and the like of the main server (hereinafter, referred to as connection destination identifier) to the backup server. Next, a connection controller as shown in the patent document 2, which can switch the VLAN connected to the user, switches the connection destination target network of the user, and a gateway switches the connection destination from a target network including the main server to a target network including the backup server, to switch the connection destination of the user.

This manipulation is executed by that a server/network cooperation controller appropriately issues an instruction to the operating server switching controller and the user connection controller. Hereinafter, the series of operations will be called a session migration below.

A difference between the present invention and the conventional technologies will be explained here.

First, the patent document 1 discloses a system for switching the connection destination of a user to a process migration destination server by shifting a logic address simultaneously with the migration of a process between servers executed by a process migration and by notifying a logic/physical address change notification to the user at the time. However, this system is effective only when the user is directly connected to a backup server through the same LAN. When the user and the backup server do not directly belong to the same LAN as in an arrangement of FIG. 13, the connection destination of the user is not switched promptly because it is not directly transmitted to the user that the logic address is migrated to the backup server. In the present invention, the same logic address and the same routing table can be set in routers by separating VLANs between the main site and the backup site. Accordingly, the connection destination of the user can be promptly migrated by switching the VLAN to which the user belongs simultaneously with the shift of the logic address (IP address) between servers.

Next, in the patent documents 3, 5, and 6, an IP address is migrated when a current system is switched to a waiting system in a dual operation arrangement. These patent documents are defective in that when connection sources (users) do not exist on the same LAN, a connection destination is not promptly switched in migration likewise the above case.

Further, the patent document 4 discloses a system in which a client executes communication by converting a connection destination IP address from a virtual IP address to an actual IP address, and, when failure occurs, the actual IP address to be converted is switched from the actual IP address of a currently using system (main) to the actual IP address of a waiting system (backup). As a result, it is assumed as if communication was executed with the virtual IP address at all times when viewed from a host application.

When failure occurs, an operating server needs to be switched between a currently using server and a waiting server (switching of operating server). However, when the timing at which they are switched is different from the timing at which the IP address is converted to the conversion destination actual IP address (switching of conversion address), a disadvantage arises in the communication between the application and the server. When, for example, the operating server is switched faster than the timing at which the conversion address is switched, even if a switched operating server transmits a packet to continuously communicate with an application, the application does not recognize that the communication is the same as the communication up to that time. This is because since address conversion is not executed, the IP address of the transmission source is different from the virtual IP address of the communication up to that time.

In the present invention, when failure occurs, the switch sequence of the operating server (for example, the sequence of a process migration) and the network switch sequence for switching a connection destination (for example, sequence for switching a user inclusion VLAN) are controlled in an integrated fashion. As a result, the above disadvantage that is caused when the sequences are controlled independently at different timings can be avoided.

EFFECT OF THE INVENTION

Advantages of the present invention reside in that a period of time during which business is interrupted can be minimized when failure occurs as well as the business can be continued without causing a user of a terminal to be aware of switching-processing of operating server which executed between servers of different networks.

This is because when an operating server is switched, it is migrated together with a connection destination identifier as well as the connection control means switches the connection destination target network of the user in a sufficiently short time so that an actual connection destination can be switched from a main server to a backup server while the user of the terminal is connected to the same connection destination identifier at all times.

BRIEF DESCRIPTION OF DRAWINGS

FIG. 17 is a block diagram showing the function of the server/network cooperation control means.

Figure 1:
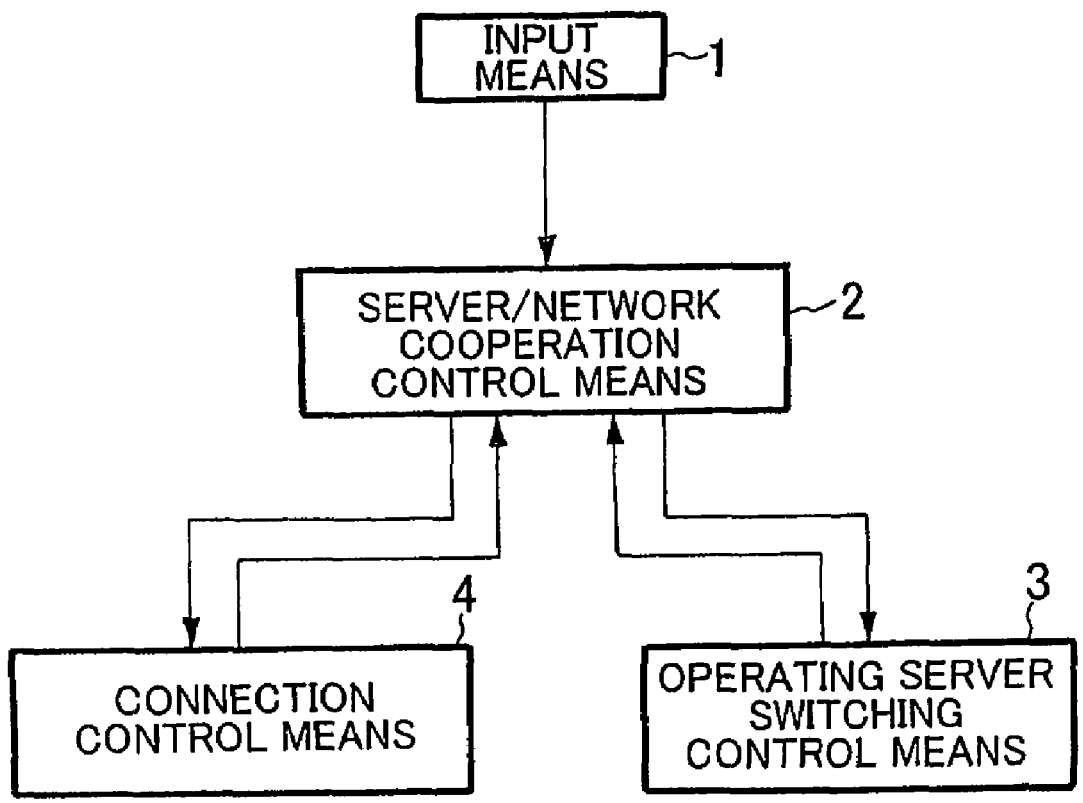
FIG. 1 is a function block diagram of a session migration device in an embodiment of the present invention.

REFERENCE NUMERALS 1 input means
2 server/network cooperation control means
3 operating server-switching control means
4 user connection control means
201 input means
202 server/network cooperation control means
203 migration daemon A
204 migration daemon B
205 user connection control means
206 motion picture delivery process
207 main server
208 backup server
209 router of main site
210 router of backup site
901 motion picture delivery server of Tokyo site
902 motion picture delivery server of Osaka site
903 user connection control means 1
904 user connection control means 2
905 user connection control means 3
906 server/network cooperation control means
907 migration daemon A
908 motion picture delivery process of Tokyo site
909 migration daemon B
910 motion picture delivery process of Osaka site
911 router of Tokyo site
912 router of Osaka site
1301 server of main site
1302 server of backup server
1303 main site
1304 backup site
1305 router of main site
1306 router of backup site
1307 router of user site
1308 user machine of user site
1309 user site
1310 wide area Ether (registered trade mark) network

BEST MODE FOR CARRYING OUT THE INVENTION

Embodiments of the present invention will be described below in detail using the drawings.

Referring to FIG. 1, a first embodiment of the present invention includes an operating server-switching control means 3 for migrating a process between servers, a connection control means 4 for dynamically switching a connection destination target network of a terminal (client), a server/network cooperation control means 2 for controlling cooperation of the operating server-switching control means 3 and the connection control means 4 at appropriate timing, and an input means 1 for sending an operating server-switching control start instruction to the server/network cooperation control means 2.

In a network system in which a user site, a main site, and a backup site are coupled with each other through a network as shown in, for example, FIGS. 2, 3, 4, and 6, the operating server-switching control means 3 is disposed to the main site and the backup site, and the connection control means 4 is disposed to the user site as a user connection control means. The operating server-switching control means 3 may be disposed to one of the main site and the backup site.

Figure 3:
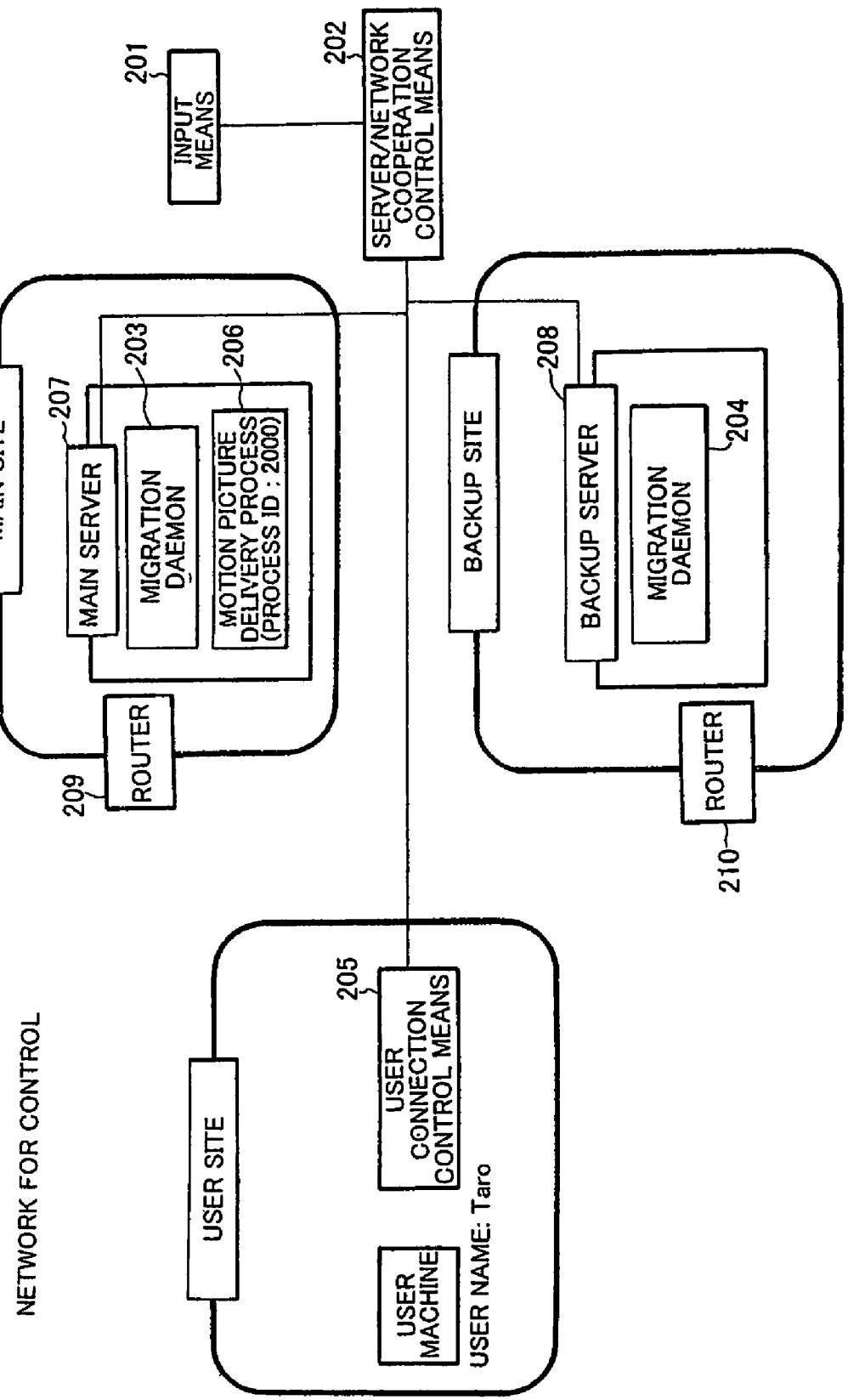
FIG. 3 is a view showing a control network for transmitting a control message in the first embodiment of the present invention.
Figure 14:
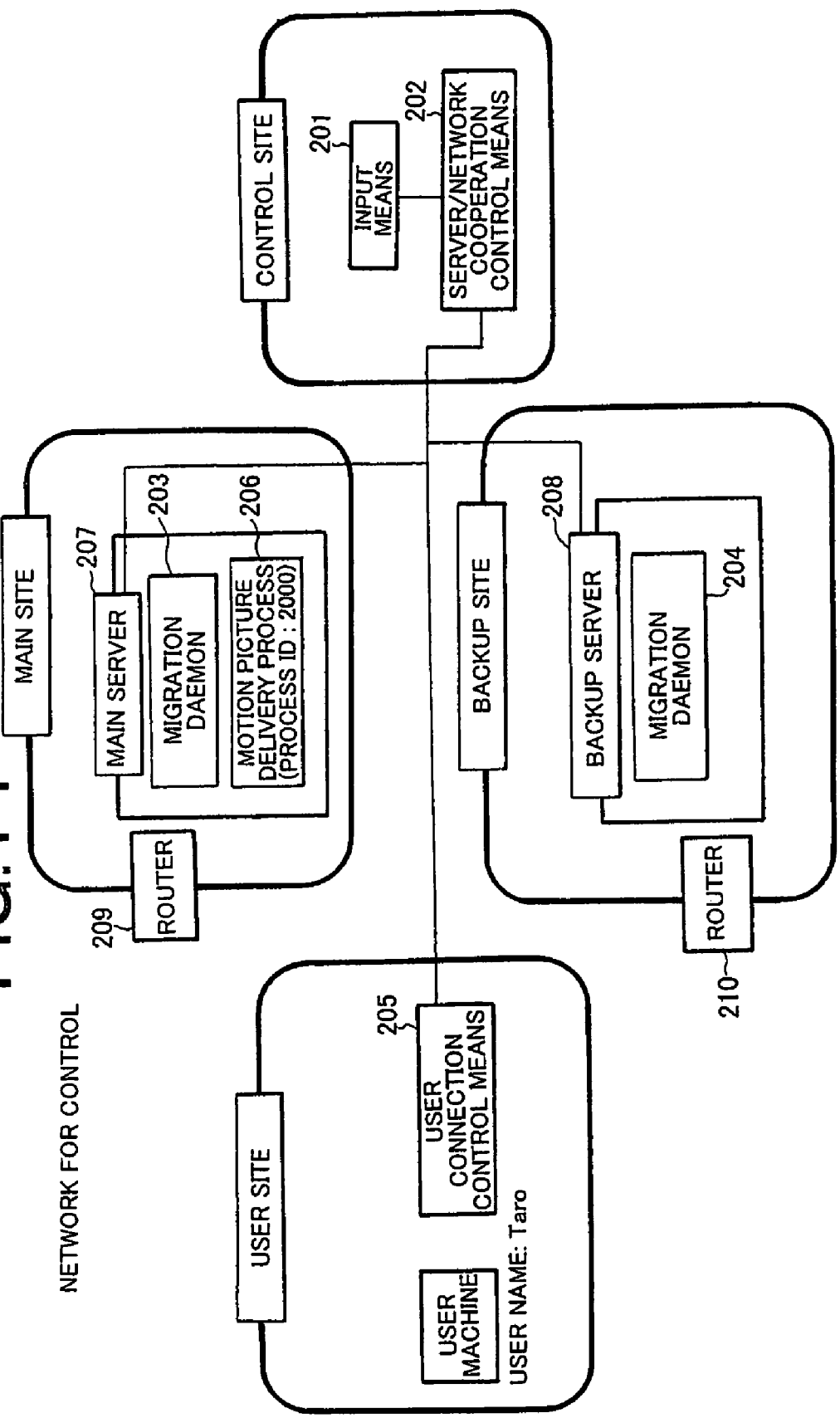
FIG. 14 is a view showing an example of an input means and a server/network cooperation control means which are disposed to a site other than a main site, a backup site, and a user site.
Figure 15:
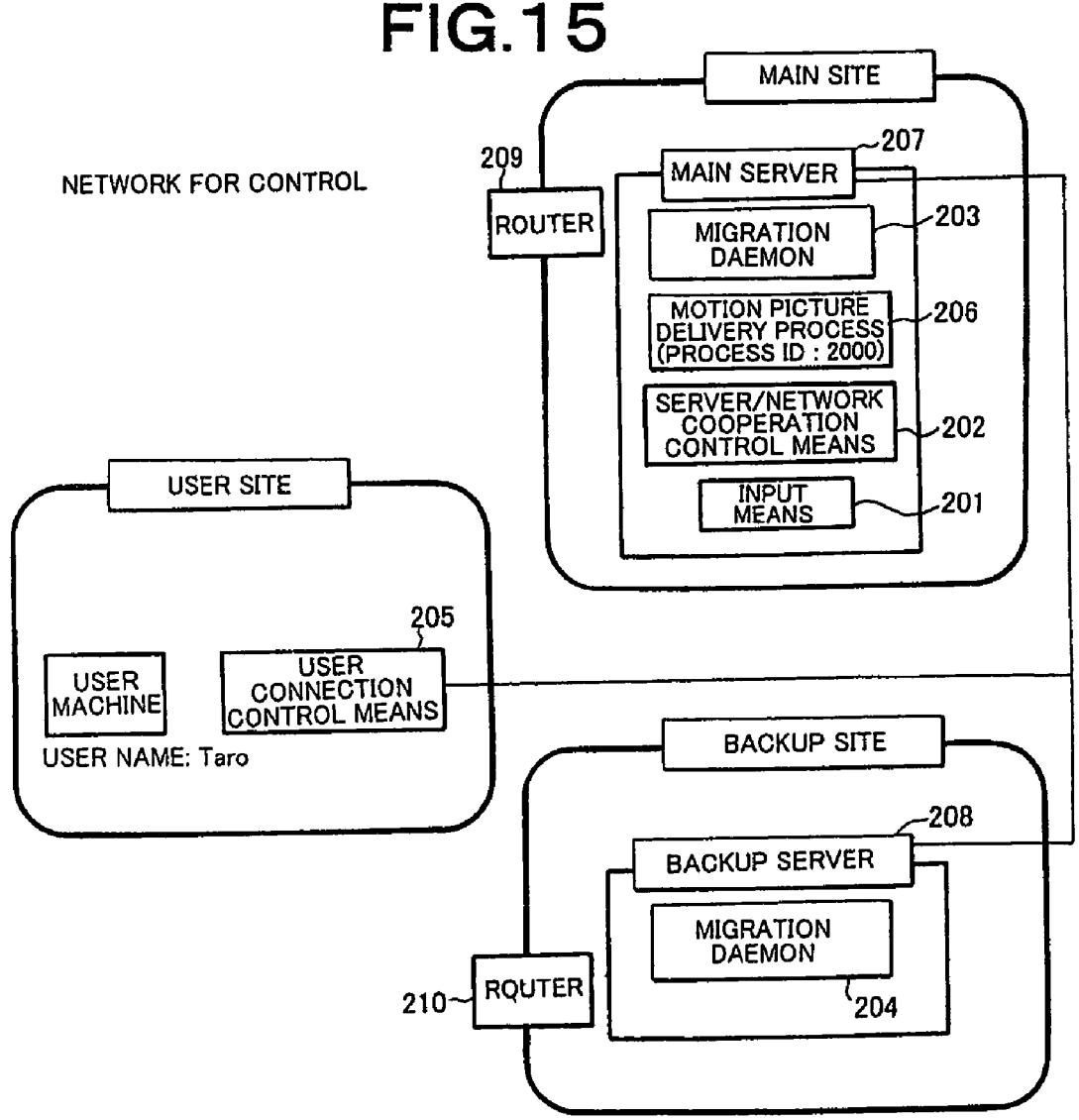
FIG. 15 is a view showing an example of the input means and the server/network cooperation control means which are disposed in the main site.

As shown in FIGS. 3 and 14, the server/network cooperation control means 2 may be disposed to a position other than the user site, the main site, and the backup site (disposed to a control site in FIG. 14), or in any one of the user site, the main site, and the backup site. When the network system according to the present invention is used as a system for preventing disaster in the main site, it is preferable to dispose the server/network cooperation control means 2 to the user site or the backup site other than the main site or to a position other than them so that the server/network cooperation control means 2 is not affected by disaster. Further, the network system according to the present invention is used for maintenance of the main site or for dispersing a load of the main site to other site when access is concentrated to the main site, the server/network cooperation control means 2 can be disposed to any one of the user site, the main site, and the backup site, or in a position other than them. FIG. 15 shows an example in which the input means and the server/network cooperation control means are disposed to the main site. For example, the input means can be disposed to the main site as a detector for detecting the load of the main server, and the server/network cooperation control means can be disposed to the main server as a program for executing control depending on the status of the load detected by the detector.

The input means 1 may be arranged integrally with the server/network cooperation control means 2 (for example, as shown in FIG. 14, the input means may be arranged as a button on a GCU (graphical user interface) of a personal computer (PC) in the control site, and the server/network cooperation control means 2 may be arranged as a program on the PC). Otherwise, the input means may be disposed independently of the server/network cooperation control means 2. For example, when the input means 1 acts as, a disaster detection device for detecting or predicting occurrence of power failure and fire and sending an operating server-switching control start instruction to the server/network cooperation control means 2, the input means 1 is disposed to the main site, and the server/network cooperation control means 2 is disposed separately from the main site so that it is not affected by the disaster.

As other specific examples of the input means 1, a load monitor, an input device or the like is used. The load monitor monitors the status of a load of the main server and sending an operating server-switching control start instruction to the server/network cooperation control means 2 when the load exceeds a given threshold value. An input device is a keyboard, a button, a button of the GUI on the display of the computer or the like that is depressed by an operator when maintenance is executed to equipment or when a warning is received from a disaster warning device in the main site in which a main server 207 is disposed.

The server/network cooperation control means 2 may be composed of software as a program on a personal computer (PC) or may be realized as an hardware arrangement. Likewise, the connection control means 4 may be composed of software as a program on the personal computer (PC) or may be realized as an hardware arrangement. Further, the operating server-switching control means 3 may be also composed of software as a program on the personal computer (PC) (for example, a migration daemon in FIG. 2) or may be realized as an hardware arrangement likewise.

The functions of the respective means will be explained below.

The server/network cooperation control means 2 sends an operating server-switching control start request to the operating server-switching control means 3. The operating server-switching control means 3 migrates the internal information of the process to a switch destination server (backup sever) using a technology such as a process migration. At the time, the process in the main server may be put in a pause status before the internal information of the process is migrated. Further, processing for shifting the connection destination identifier from the main server to the backup server may be executed simultaneously with the migration of the internal information of the process. On the completion of the processing, the operating server-switching control means 3 notifies the server/network cooperation control means 2 that the operating server-switching control is completed.

Further, when the process is put in the pause status simultaneously with the migration of the internal information of the process, the operating server-switching control means 3 receives a process resuming request from the server/network cooperation control means 2 after the operating server-switching control completion notification is issued, and shifts the migrated process from the pause status to an operating status.

When a connection destination target network switching request is sent from the server/network cooperation control means 2, the connection control means 4 switches the connection destination target network of the user from a main target network to a backup target network, and sends a connection destination target network switching completion notification to the server/network cooperation control means 2. As a specific method of realizing the above processing, there is a method of switching a VLAN to which the user is connected from a VLAN capable of being connected to the main site to a VLAN capable of being connected to the backup site. The method is described in the after-mentioned embodiments. Further, the target network may be a network virtually or physically separated by other method. The method is VPN (Virtual Private Network) or the like which uses a tunnel technology, such as IPsec (Security Architecture for Internet Protcol), L2TP (Layer 2 Tunneling Protocol), or MPLS (MultiProtocol Label Switching).

The server/network cooperation control means 2 stores the information of a migration target process, the information of the main server by which the process is executed, the information of the backup server to which the process is migrated, the information of a user name whose connection destination target network is switched, and the information of the connection destination target network to which switch is executed, in a storage unit.

The server/network cooperation control means 2 receives a session migration start request from the input means 1. On receiving the request, the server/network cooperation control means 2 sends an operating server-switching control start request to the operating server-switching control means 3. At the time, the server/network cooperation control means 2 supplies the information of the migration target process, the information of the main server by which the process is executed, the information of the backup server to which the process is migrated, to the operating server-switching control means 3.

Further, on receiving an operating server-switching control completion notification from the operating server-switching control means 3, the server/network cooperation control means 2 sends a connection destination target network switching request to the connection control means 4. At the time, the server/network cooperation control means 2 supplies the information of the name of the switch target user and the information of the connection destination target network to which the switch is executed, to the connection control means 4. When a connection destination target network switching completion notification is sent from the connection control means 4 to the server/network cooperation control means 2, it sends a process resuming request to the operating server-switching control means. At the time, the server/network cooperation control means 2 supplies the information of the backup server and the information of the migration target process, to the operating server-switching control means 3. On receiving a process resuming (resumption)-completion notification from the operating server-switching control means 3, the server/network cooperation control means 2 completes the server/network cooperation control operation.

Figure 7:
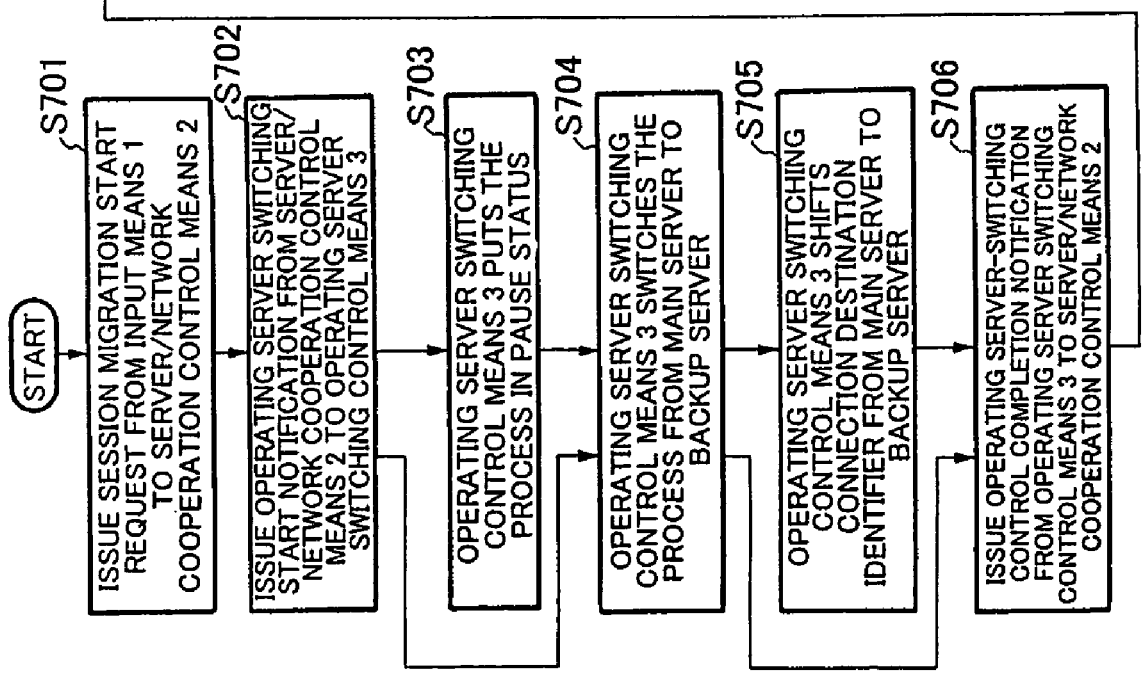
FIG. 7 is a view of a flowchart showing an execution sequence in an embodiment of the present invention.

A sequence for executing the embodiment will be explained with reference to a flowchart shown in FIG. 7.

In an ordinary time, a migration target process operates on the main server, and a user machine as a terminal (client) makes use of a process by connecting to a connection destination identifier allocated to the main server and executes business.

An executant issues a session migration start request to the server/network cooperation control means 2 by using the input means 1 (step S701). The executant may be an operator or an automatic execution unit such as a not shown disaster detection device.

On receiving the session migration start request, the server/network cooperation control means 2 issues an operating server-switching control start notification to the operating server-switching control means 3 and indicates to start switching of an operating server (step 702). At the time, the information to be supplied to the operating server-switching control means 3 may include the information of the migration target process, the information of the main server by which the process is executed, the information of the backup server to which the process is migrated, and the information of the connection destination identifier allocated to the main server.

On receiving the operating server-switching control start notification from the server/network cooperation control means 2, the operating server-switching control means 3 switches the operating server. Specifically, the operating server-switching control means 3 executes the following processing P1 to P4 in this order: P1. the process is put in a pause status (step S703); P2. the server that operates the process is switched from the main server to the backup server by using a technology such as a process migration or the like (step S704); P3. the connection destination identifier such as a virtual IP address or the like is shifted from the main server to the backup server (step S705); and P4. an operating server-switching control completion notification is sent to the server/network cooperation control means 2 (step S706). The processing P1 (that is, step S703) and the processing P3 (that is, step S705) may be unnecessary.

Note that when the processing P1 is executed, the process is in the pause status after the server is migrated, and the process is still in the pause status after the server is migrated even when the operation of the processing P4 is completed.

Next, on receiving the operating server-switching control completion notification, the server/network cooperation control means 2 sends a connection destination target network switching request to the connection control means 4 (step S707). At the time, the information of the user name whose connection destination target network is to be switched and the information of the connection destination target network to which switch is executed corresponding to the user may be supplied together.

The connection control means 4 switches the connection destination target network of the user corresponding to the user name whose connection destination target network is to be switched, to the connection destination target network to which the switch is executed (step S708). Here, when the connection destination target network of the user is switched by switching the connection destination VLAN of the user, it is assumed that the VLAN to which switch is executed includes only a backup server and does not include a main server as a member. On the completion of switch, the connection control means 4 issues a connection destination target network switching completion notification to the server/network cooperation control means 2.

When the process pause processing is not executed at step S703, all the processes of the server/network cooperation control is completed.

When the process pause processing is executed at step S703, the server/network cooperation control means 2 issues a process resuming-request notification to the operating server-switching control means 3 on receiving the connection destination target network switch completion notification (step S709). At the time, the server/network cooperation control means 2 may also notify the operating server-switching control means 3 of the information of the resuming target process (that is, the information of the migrated process).

On receiving the process resuming (resumption)-request notification from the server/network cooperation control means 2, the operating server-switching control means 3 resumes the target process (step S710).

When the resumption of the process is completed, the operating server-switching control means 3 issues a process resuming-completion notification to the server/network cooperation control means 2 (step S711).

On receiving the process resuming-completion notification, the server/network cooperation control means 2 completes all the processes of the session migration.

After the server/network cooperation control means 2 receives the process resuming-completion notification (after the server/network cooperation control means 2 receives the connection destination target network-switching completion notification when the step S703 is not executed), it may notify an output means of that the session migration is completed to notify the executant of the completion of the session migration.

FIRST EMBODIMENT

Next, embodiments of the present invention will be explained below using FIGS. 2 to 6.

Figure 2:
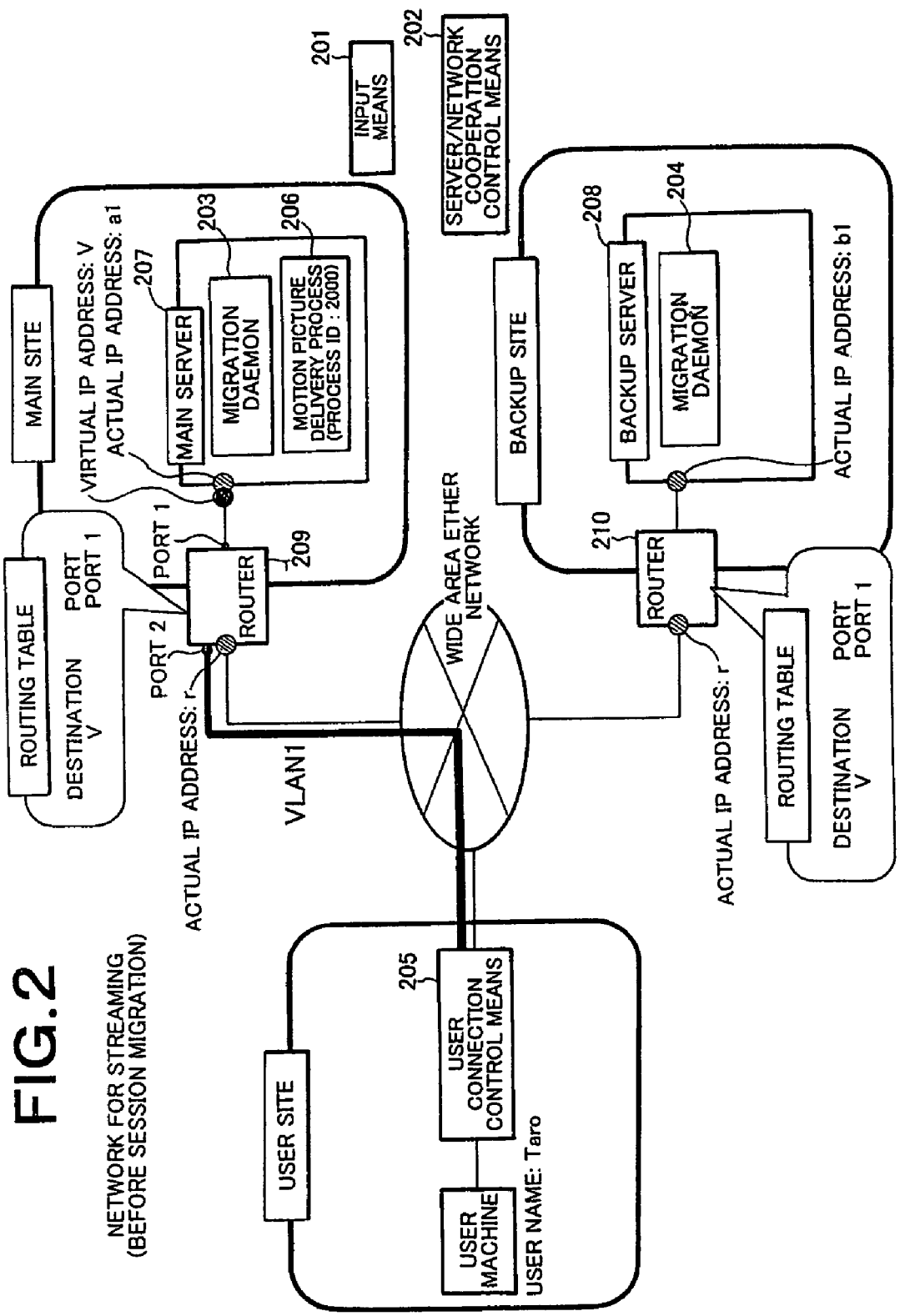
FIG. 2 is a view showing a network for receiving streaming-data before a session migration operates in an first embodiment of the present invention.

In the embodiments, as shown in FIG. 2, a user is connected to a motion picture delivery process 206 on a main server 207 having a virtual IP address "v" through wide area Ether network and receives streaming data by making use of TCP (Transmission Control Protcol)/IP. Further, the user is previously connected to a VLAN "1" that includes a router 209 of a main site and does not includes a router 210 of a backup site, by a user connection controller.

Further, as shown in FIG. 14, a server/network cooperation control means 202 is installed as a program on a personal computer (PC). An input means 201 is disposed as a button on a GUI (graphical user interface) on the PC on which the program of the server/network cooperation control means 202 is installed. An output means is mounted as a display connected to the PC on which the program of the server/network cooperation control means 202 is installed.

Further, Linux is installed as OS on a main server 207 and on a backup server 208, and an operating server-switching control means are installed as a migration daemon A203 on the main server 207 and as a migration daemon B204 on the backup server 208, and operating server-switching control means are installed as respective programs (daemons) on Linux. Note that the operating server-switching control means may be installed on any one of the main server 207 and the backup server 208 so as to migrate a process by controlling one server from the other server. Further, the operating server-switching control means may be installed separately from the main server 207 and backup server 208 as a program on a PC which is provided so as to be connected to the main server 207 and backup server 208.

Further, a user connection control means 205 acting as a connection control means is installed as a program on a PC acting as a network access gateway of a user site. The PC acting as the network access gateway is connected to a user machine constituting a user terminal of the user site. The user connection control means 205 may be disposed to the user terminal (user machine).

Further, as shown in FIG. 3, the server/network cooperation control means 202, the operating server-switching control means (that is, the migration daemon A203 and the migration daemon B204), and the user connection control means 205 can transmit and receive a control command each other through a control network.

Figure 4:
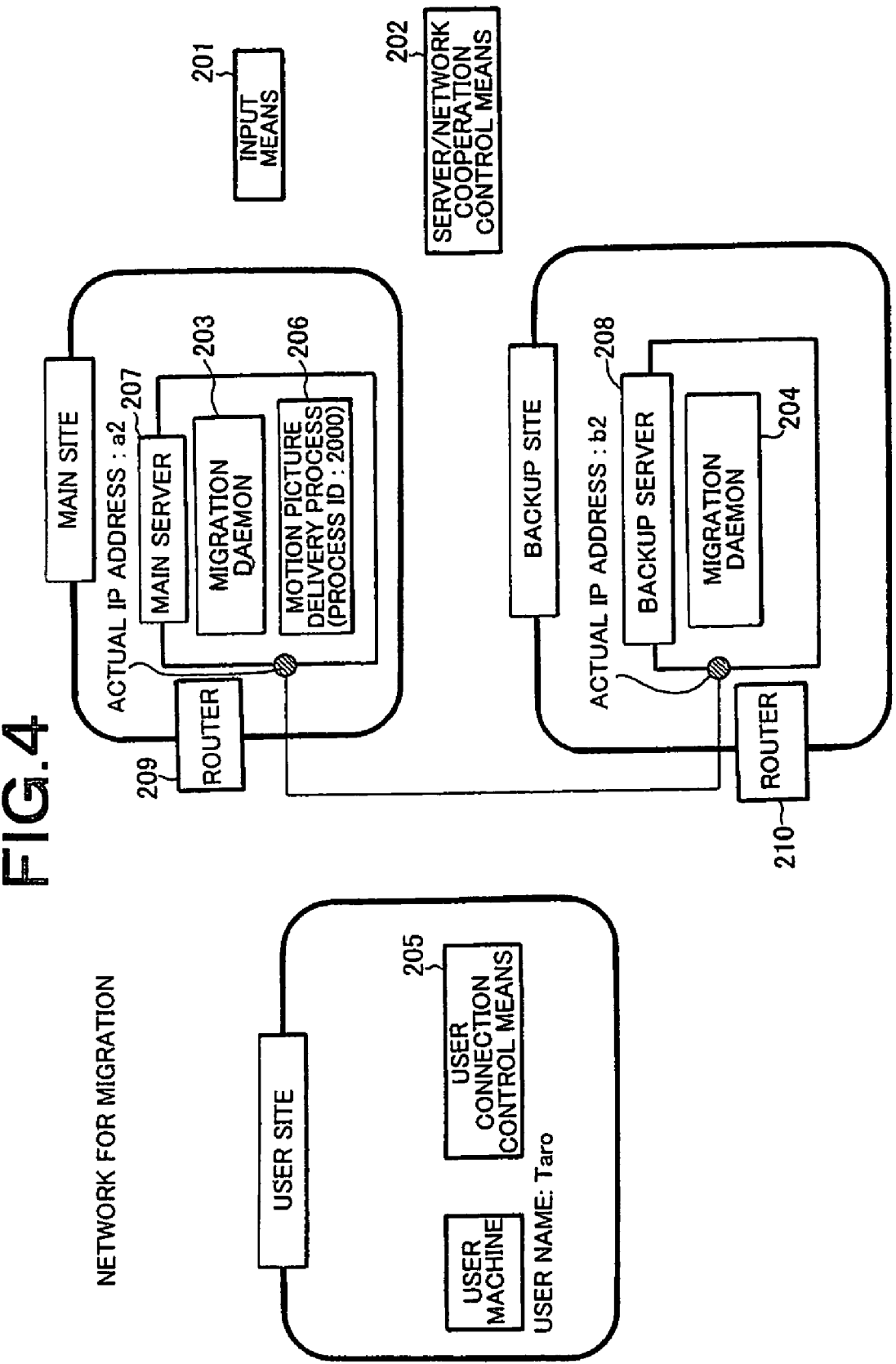
FIG. 4 is a view showing a migration network for transmitting data for migrating a process between servers in the first embodiment of the present invention.

Further, the main server 207 and the backup server 208 may prepare a dedicated network as shown in FIG. 4 as a data transfer path for the process migration. Further, a path control means may be used to dynamically secure a band.

Further, a route to the virtual IP address "v" is explicitly shown in each of the routing tables of the router 209 and router 210. Further, the same IP address ("r" in FIG. 2) is given to the interface on the wide area Ether (registered trade mark) network side. Here, since the router 209 and the router 210 do not belong to the same network (in this case, VLAN), no problem arises even if the two same IP addresses exist and even if there are two paths to the same IP address.

Figure 5:
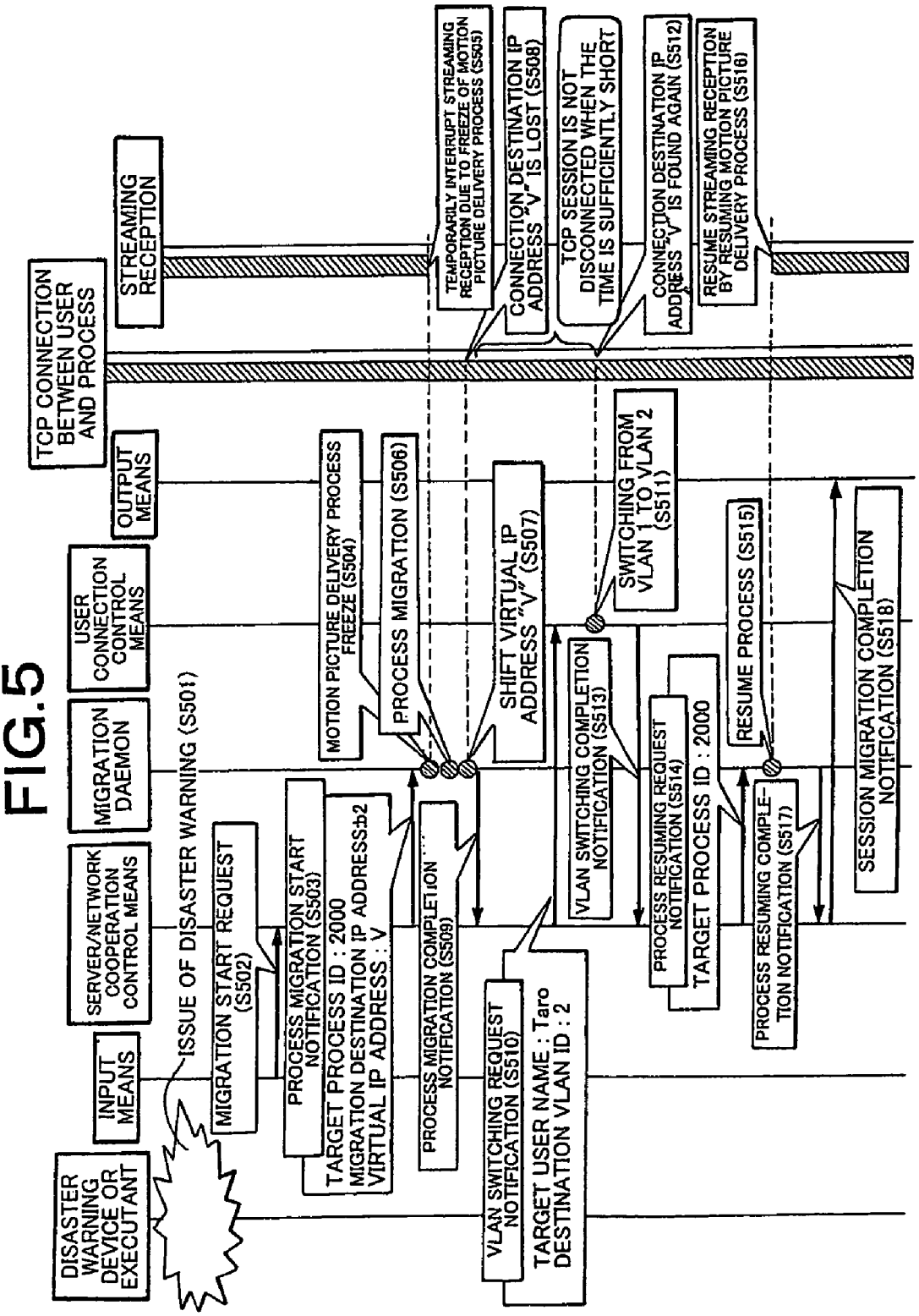
FIG. 5 is a view of a message sequence showing a message transmitted and received between respective means in the first embodiment of the present invention.

A series of operations of the session migration will be explained below in detail based on FIG. 5.

On receiving a disaster warning in the main site in which the main server 207 is disposed (step S501), the executant depresses the button of the GUI as the input means 201 of a session migration start request and issues the session migration start request to the server/network cooperation control means 202 (step S502).

The server/network cooperation control means 202 issues a process migration start notification to the operating server-switching control means A as a migration source (step S503). At the time, the server/network cooperation control means 202 notifies a process ID "2000" as the information of the migration target process, an actual IP address "b2" as the information of a migration destination server, and the virtual IP address "v", together with the above notification. Only the information of timing at which the process is migrated may be notified as the information of the migration target process, and the migration daemon A203 may specify the migration process and migrates it.

Next, on receiving the process migration start request, the migration daemon A203 executes the following processing:
1. it puts the motion picture delivery process 206 having the process ID "2000" on its server in a pause (freeze) status (step S504); 2. it migrates the motion picture delivery process 206 (step S506); 3. it shifts the virtual IP address "v" to the backup server 208 through the migration daemon B204 (step S507); and 4. it sends a process migration completion notification to the server/network cooperation control means 202 (step S509).

The process migration completion notification may be sent by the migration daemon B204 of the backup server. This is also the same in second and third embodiments described later.

The server/network cooperation control means 202 receives the migration completion notification from the operating server-switching control means A and issues a VLAN switching request to the user connection control means 205 (step S510). At the time, the server/network cooperation control means 202 notifies a target user name "Taro" and a switch destination VLAN ID "2" together with the request.

The user connection control means 205 connects the user "Taro" connected to a VLAN "1" up to that time, to a VLAN "2" (step S511). On the completion of the switching, the user connection control means 205 issues a VLAN switching-completion notification to the server/network cooperation control means 202 (step S513).

Next, on receiving the VLAN switching-completion notification, the server/network cooperation control means 202 notifies the migration daemon A203 of a process resuming-request notification (step S514) together with a resuming target process ID "2000".

Figure 6:
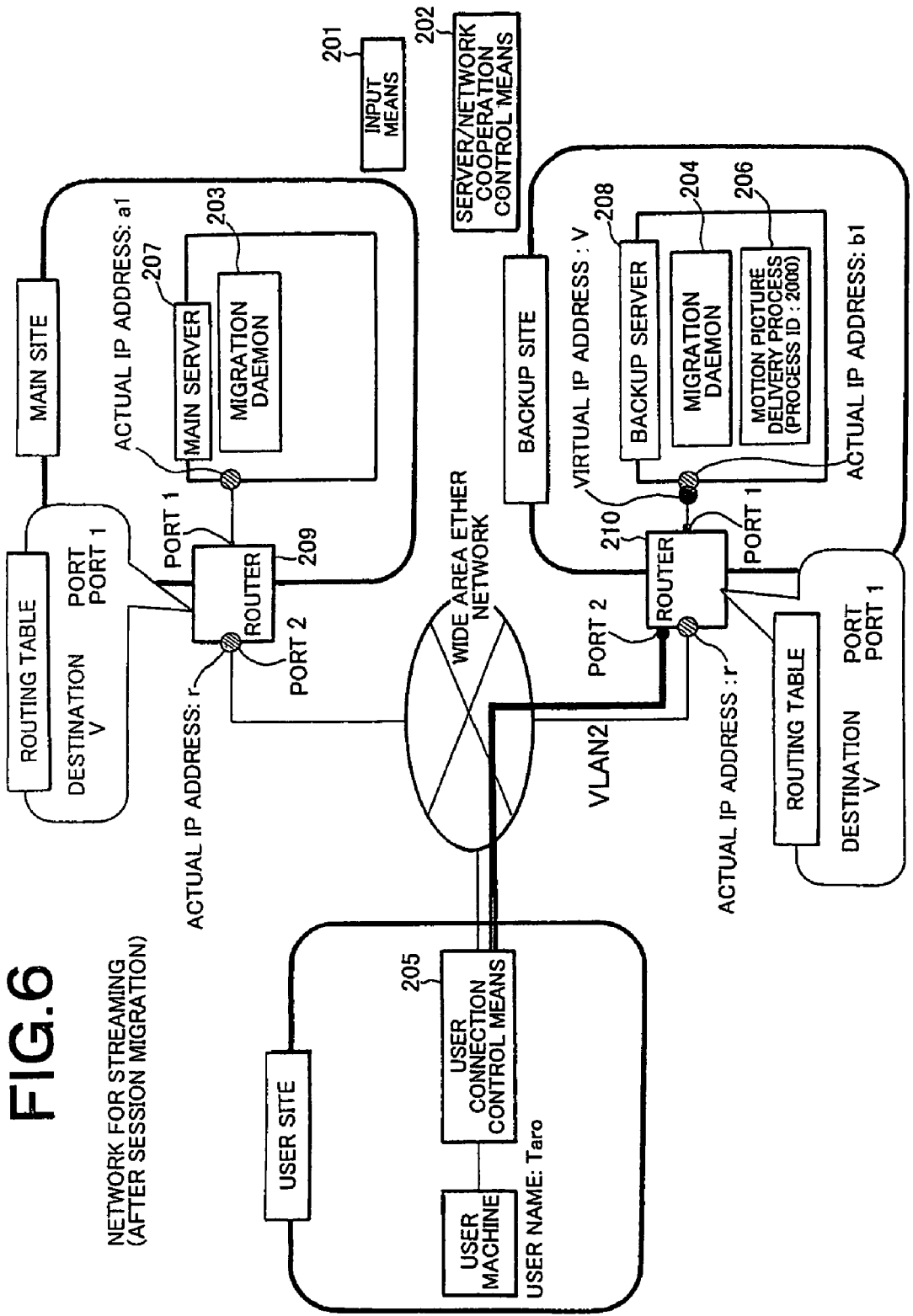
FIG. 6 is a view showing the network for receiving streaming-data after the session migration operates in the first embodiment of the present invention.

The migration daemon A203 executes a manipulation for releasing the motion picture delivery process 206 having the process ID "2000" in the backup server 208 from the pause status (resuming of the process) through the migration daemon B204 (step S515). At the time, the user can resume reception of the streaming data again (FIG. 6). On the completion of resuming of the process, the migration daemon A203 issues a process resuming-completion notification to the server/network cooperation control means 202 (step S517).

On receiving the process resuming-completion notification, the server/network cooperation control means 202 completes all the processes of the migration, issues a session migration completion notification to the output means (step S518), and notifies the executant that the session migration is completed.

In the series of the processes, the users temporarily lose the connection destination IP address at the time that the process migration is completed. However, since the VLAN is switched promptly, the connection destination IP address can be found again before a TCP session is disconnected by a host application and the like. As a result, communication can be resumed without being interrupted. Further, since switching of the VLAN is used as the means for changing the connection destination target network of the users, it is possible to provide the users with such a recognition that they are connected to the same IP (here, the virtual IP "v") at all times before and after the process migration. Accordingly, the migration can be realized without causing the users to be aware of it as far as possible.

In the above sequences, the phenomenon that the user can recognize is the following sequence.

The user establishes the IP address "v" of the main server 207 and the TCP session, and receives the streaming data from the motion picture delivery process 206.

Reception of the streaming data is temporarily interrupted as soon as the motion picture delivery process 206 is frozen (step S504).

Next, when the virtual IP address "v" is shifted from the main server 207 to the backup server 208 (step S507), the user loses the virtual IP address "v" to which he or she is connected up to that time. However, when the VLAN to which the user is connected is switched from a VLAN 1 to a VLAN 2 (step S511), the user finds the virtual IP address "v" again (step S512). It is possible to make the period of time during which the IP address is lost, that is, the period of time from step S507 to step S511 sufficiently shorter than the period of time during which the host application detects congestion and disconnects the TCP session. Accordingly, the user can maintain communication without disconnecting the TCP session during the period of time.

When the motion picture delivery process 206 is resumed (step S515), the user can receive the streaming data from the motion picture delivery process 206 (step S516) again. While the motion picture delivery process is being frozen, that is, during the period of time from step S504 to step S515, reception of the streaming data by the user is interrupted. However, ordinarily, a buffer is prepared to a browser of motion picture application so that a motion picture is uninterrupted even if communication is interrupted for several seconds. Further, it is possible to reduce the period of time from step S504 to step S515 to such a degree as to maintain the quality of the motion picture by the buffer. Accordingly, the process migration can be executed across the routers through the wide area network without affecting the user who browses the motion picture.

FIG. 17 is a block diagram showing the function of the server/network cooperation control means. An input means controller 1403 outputs the session migration start request from the input means 1 to a status manager 1401. An operating server-switching control means controller 1404 transmits and receives information to and from the operating server-switching control means 3, and a user connection control means controller 1405 transmits and receives information to and from the user connection control means. The status manager 1401 controls the operation of the session migration of the server/network cooperation control means shown in FIGS. 5 and 7. A setting storage unit 1402 stores information of the target process number of a server 1, a migration destination server IP address, the virtual IP address, or the like.

Figure 16:
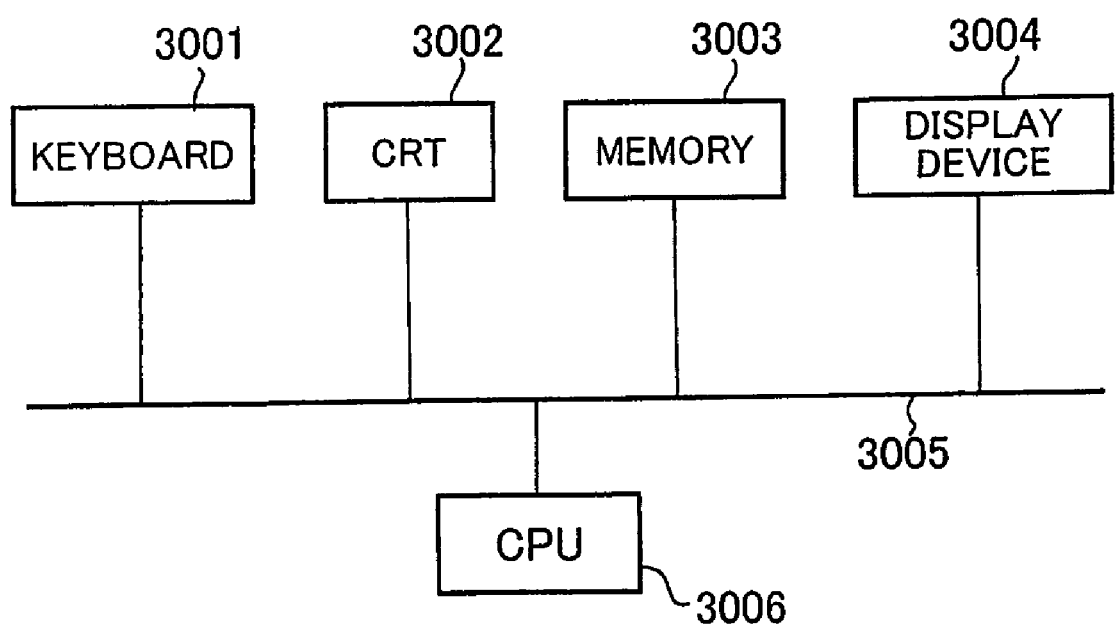
FIG. 16 is a block diagram showing an arrangement of a computer.

In the embodiment, the respective control units and status manager of the server/network cooperation control means are installed as programs on the personal computer (PC). For example, as shown in FIG. 16, the programs are stored in a disc device 3004 such as a hard disc or the like, the information of the target process number or the like is stored in a memory 3003 such as a DRAM or the like, and the programs are executed by a CPU 3006. A keyboard acts as an input means 1. A CRT 3002 acts as a display means for displaying an information processing status, a result of migration processing, and the like. Reference numeral 3005 shows a bus such as a data bus or the like. Note that although the function of the server/network cooperation control means is realized by software, it may be realized by a hardware arrangement.

SECOND EMBODIMENT

Next, a second embodiment of the present invention will be explained. The embodiment uses the same arrangement as the first embodiment.

In the embodiment, an operator manually executes a session migration when maintenance such as upgrade of a system or the like, which requires to interrupt execution of a process, is executed in a main site. The embodiment is different from the first embodiment only in that the operator executes the session migration according to the maintenance schedule of the main site in place of issue of a disaster warning.

THIRD EMBODIMENT

Next, an third embodiment of the present invention will be explained using FIGS. 8 to 12.

The embodiment has an object of dispersing the load of a site (in FIG. 9, Tokyo site) to other site (in FIG. 9, Osaka site) when access is concentrated to the site. At the time, the access dispersed to many processing points realizes that a user to be connected is connected to a geographically nearest site to reduce an effect of delay or the like.

Figure 9:
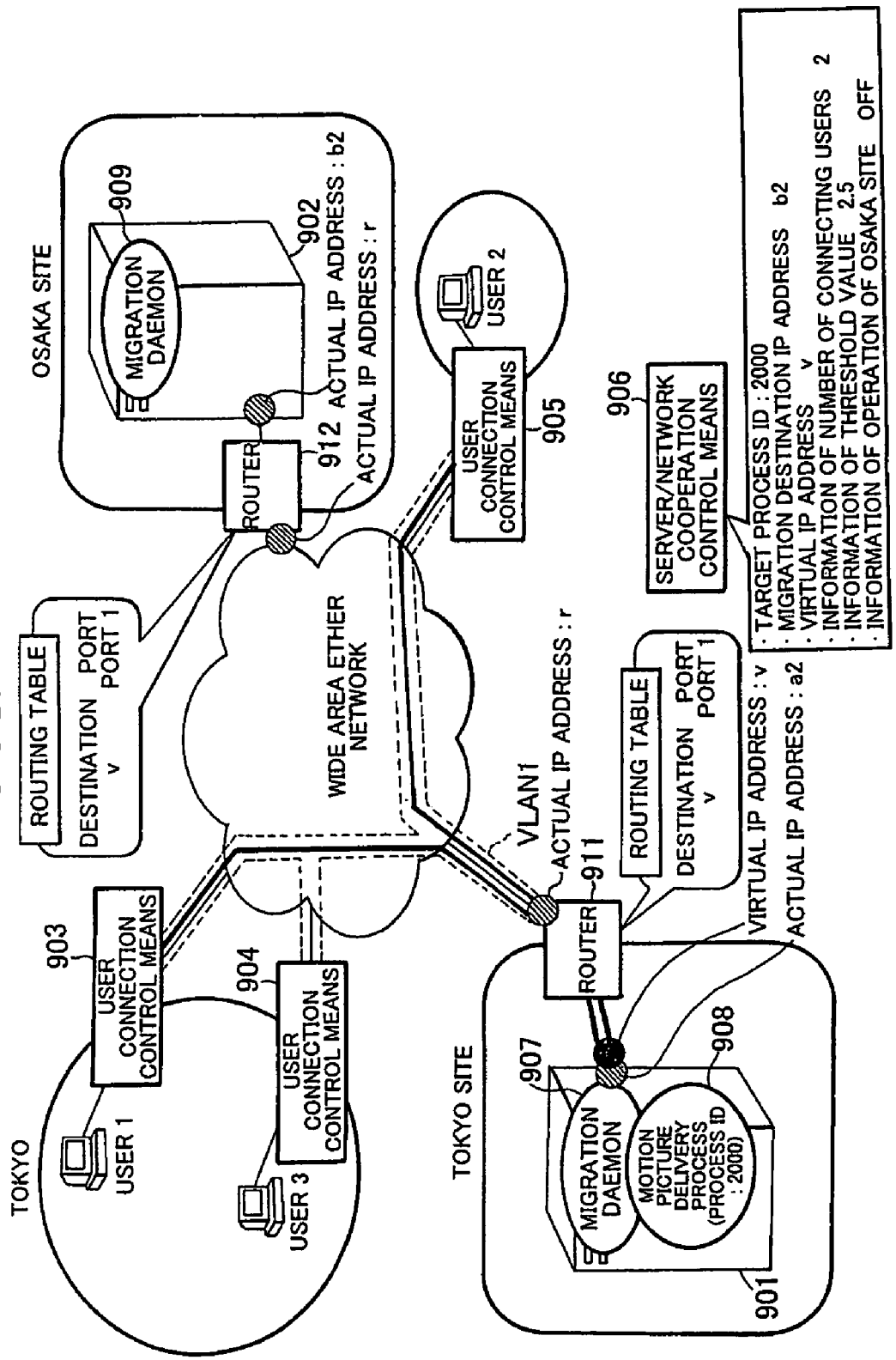
FIG. 9 is a view showing a network for receiving streaming-data before a session migration operates in the third embodiment of the present invention.
Figure 10:
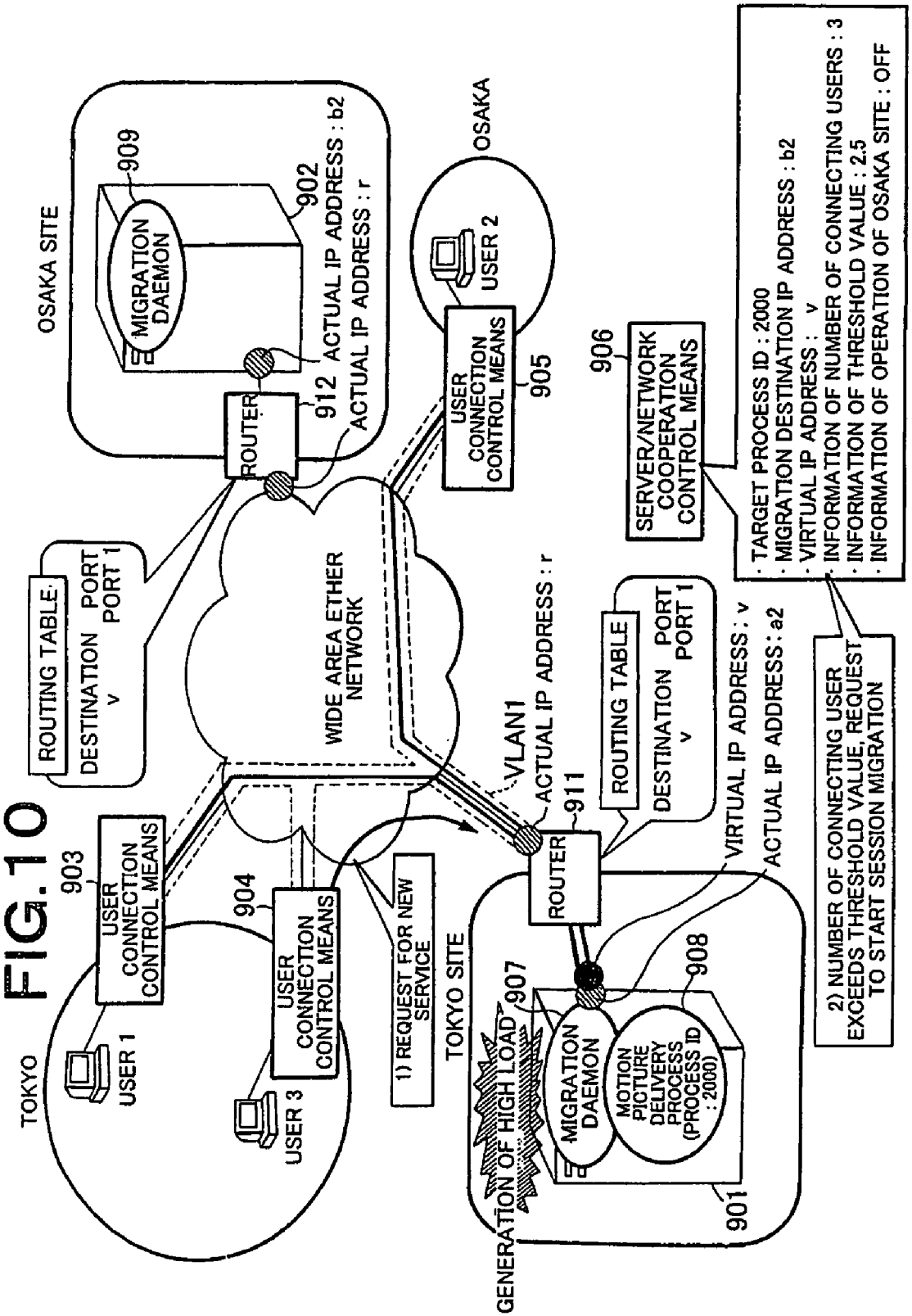
FIG. 10 is a view showing a behavior until a high load is generated and the session migration operates in the third embodiment of the present invention.
Figure 11:
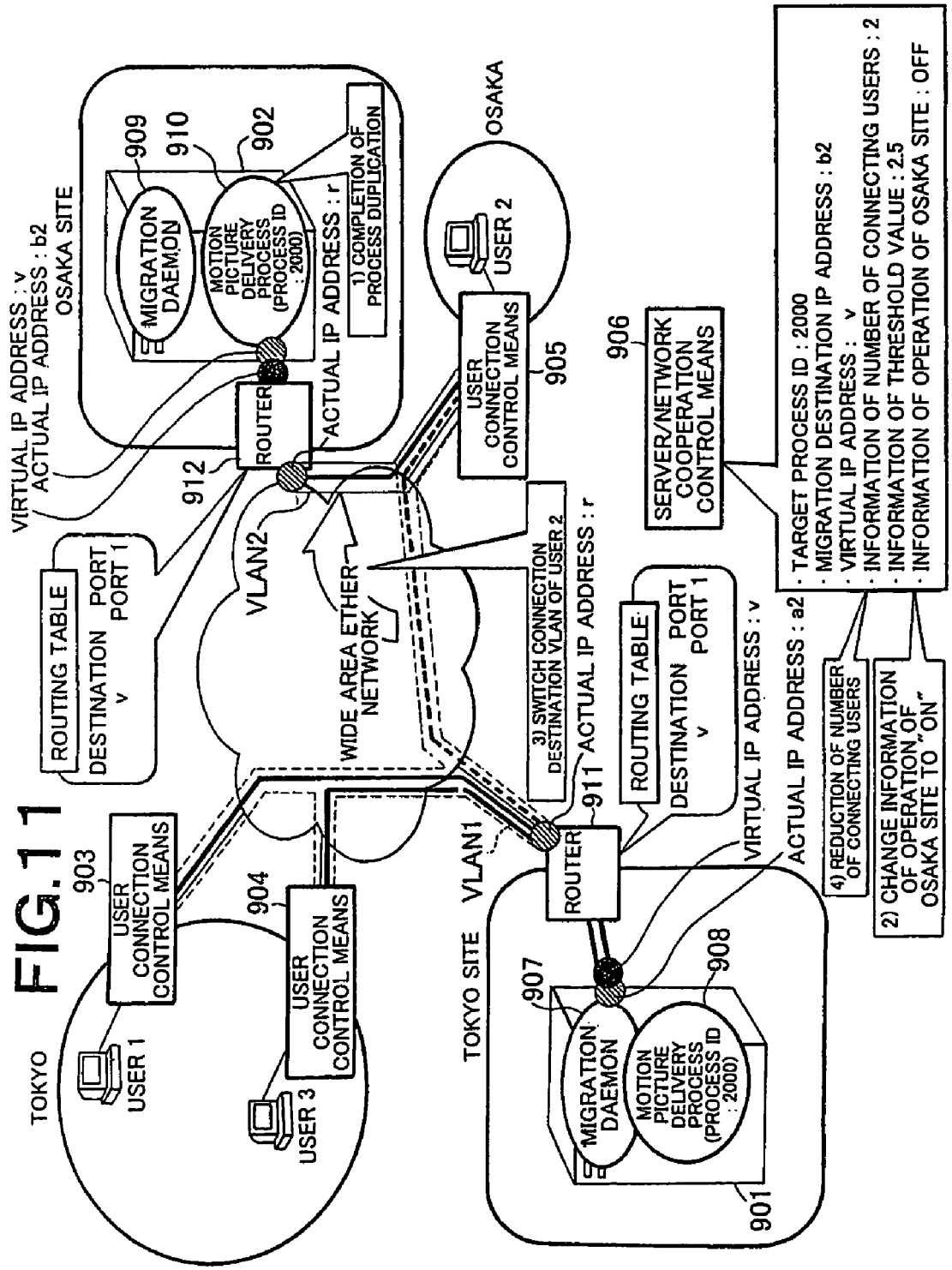
FIG. 11 is a view showing a behavior in which the session migration operates and a process is duplicated in the third embodiment of the present invention.
Figure 12:
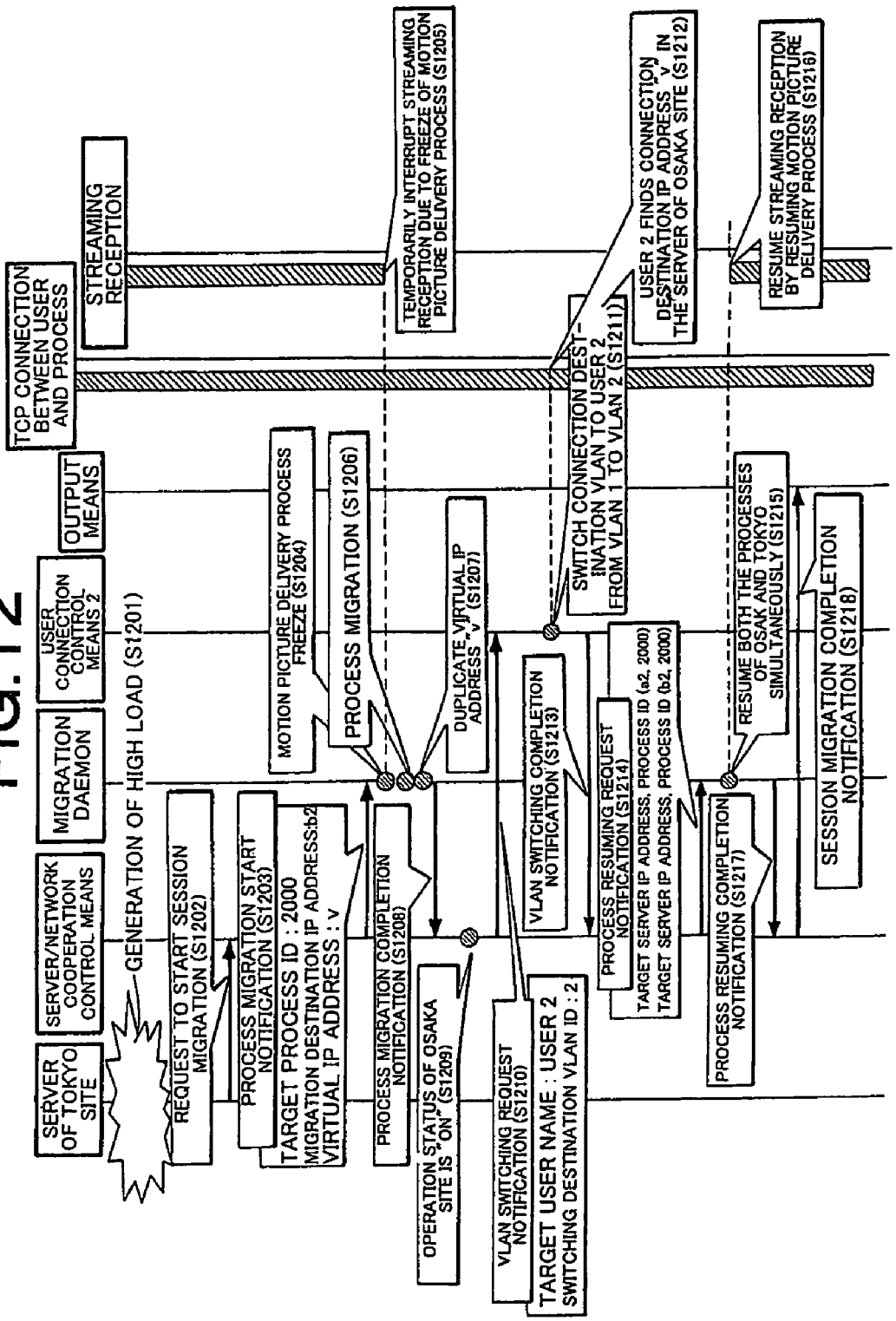
FIG. 12 is a view of a message sequence showing a message transmitted and received between respective means in the third embodiment of the present invention.
Figure 13:
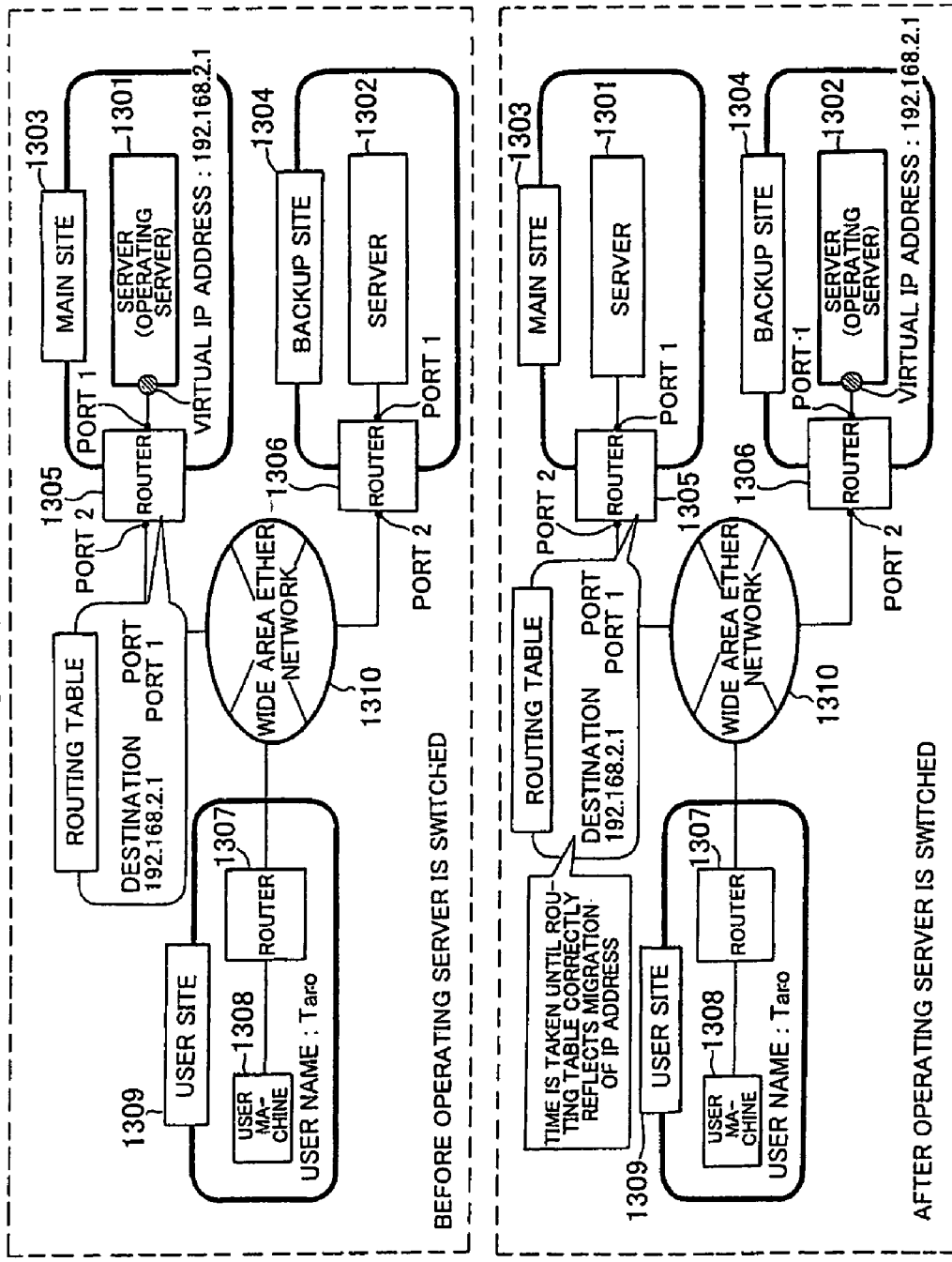
FIG. 13 is a view explaining difficulty of sharing a connection destination identifier between remote servers through a wide region network.

In an initial status (FIG. 9), a server 901 in the Tokyo site provides a motion picture delivery service, and user 1 in Tokyo and user 2 in Osaka are connected to the server 901 to make use of the motion picture delivery service. A server/network cooperation control means has the information of the number of users connecting to the server 901 in the Tokyo site at present, the information of a threshold value for dispersing a load when the number of connecting users exceeds the threshold value, and the information of an Osaka site operating status showing whether or not the motion picture delivery service operates in the Osaka site. In the case of FIG. 9, the information of the number of connecting users is "2", the information of the threshold value is "2.5", and the information of operation of the Osaka site is "OFF".

Figure 8:
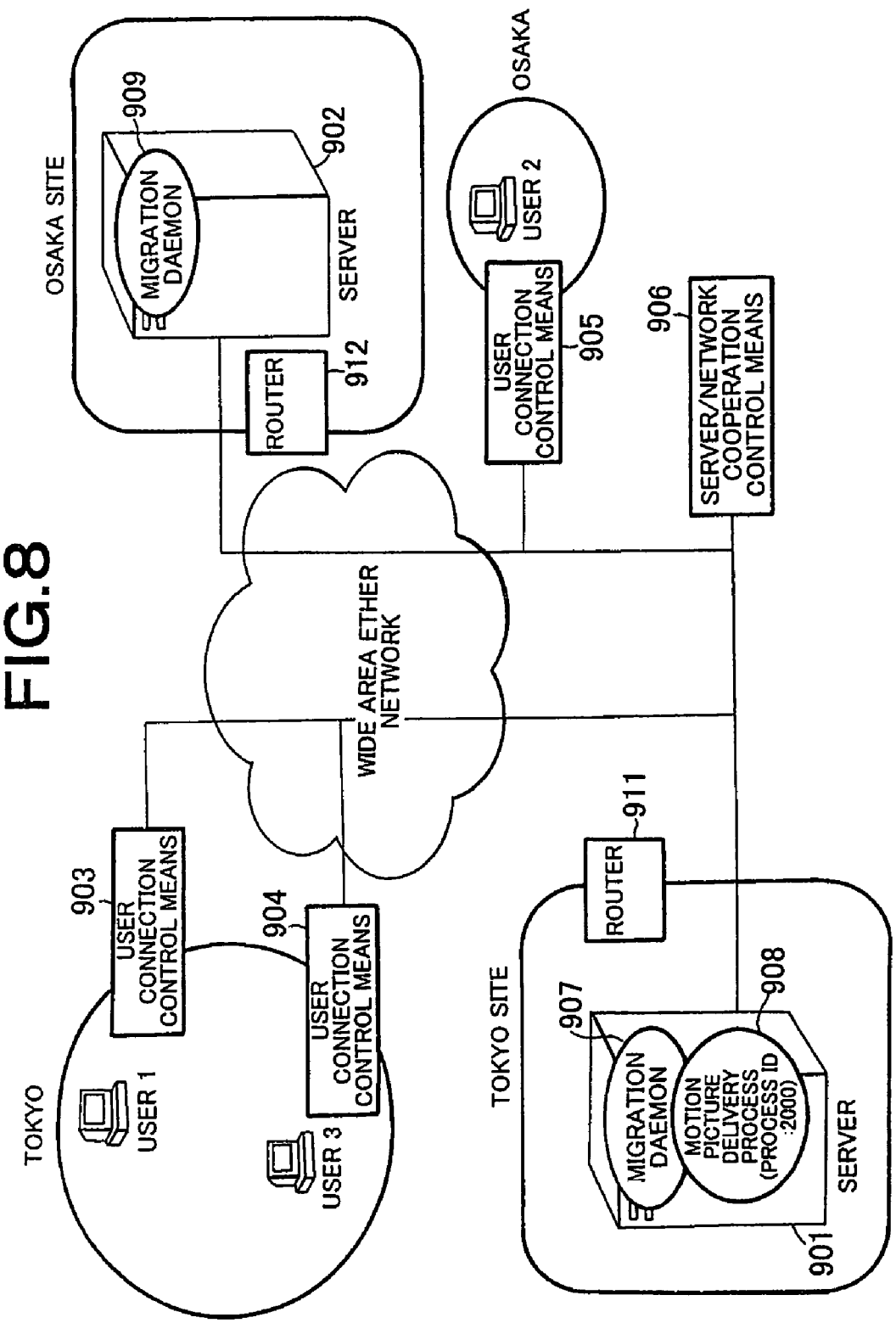
FIG. 8 is a view showing a control network for transmitting a control message in a third embodiment of the present invention.

The server/network cooperation control means 906, a migration daemon A907, a migration daemon B909, and user connection control means 1 to 3 (903 to 905) can transmit and receive a control command each other through a physical network or a virtual network dedicated to control such as VPN or the like as show in FIG. 8.

Further, similar to the first embodiment, a router 911 of the Tokyo site and the router 912 of Osaka site do not belong to the same VLAN, statically hold routing tables to each of which a route to the same virtual IP address "v" is explicitly shown, and the same IP address (in FIGS. 9 to 11, "r") is allocated to the interface on wide area Ether (registered trade mark) network.

When a new connection request is issued from the user 2 in Tokyo, since the number of users connecting to the Tokyo site "3" exceeds the threshold value "2.5", and the information of operation of the Osaka site is "OFF", the session migration is started. A sequence at the time will be explained with reference to FIG. 12.

When a high load is generated in the server 901 of the Tokyo site (step S1201), the server 901 of the Tokyo site or a load monitor monitoring the load status of the server issues a session migration start request to the server/network cooperation control means (step S1202).

On receiving the session migration start request, the server/network cooperation control means issues a process migration start notification to the migration daemon 907 of the server 901 of the Tokyo site (step S1203). At the time, the server/network cooperation control means notifies a process ID "2000" as the information of the migration target process, an actual IP address "b2" as the information of a migration destination server, and the virtual IP address "v" together with the above notification.

Next, on receiving the process migration start request, the migration daemon 907 executes the following processing: processing P11. it puts a motion picture delivery process 908 having the process ID "2000" on its server in a pause (freeze) status (step S1204); processing P12. it migrates the motion picture delivery process 908 (step S1206); processing P13. it duplicates the virtual IP address "v" to a server 902 of the Osaka site through the migration daemon B909 (step S1207); and processing P14. it sends a process migration completion notification to the server/network cooperation control means 906 (step S1208).

On receiving the migration completion notification from the migration daemon 907, the server/network cooperation control means 906 changes the information of operation of the Osaka site to "ON" (step S1209) and issues a VLAN switching request to a user connection control means 905 (step 1210). At the time, the server/network cooperation control means 906 notifies a target user name "user 2" and a switching destination VLAN ID "2" together with the request. Here, all the users connected to the process up to that time are not selected as subjects to be switched and a part of them may be selected as the subjects to be switched. As a criterion for selecting the part of the users, there is contemplated a criterion for selecting only the users near to a site in which a process operates newly by process migration. In the embodiment, the user 2 connecting from Osaka is selected as the user to be switched and the connection destinations of a user 1 and a user 3 are not switched.

The user connection control means 905 connects the user "user 2" connected to a VLAN "1" up to that time, to a VLAN "2" (step S1211). On the completion of the switching, the user connection control means 2 (905) issues a VLAN switching-completion notification to the server/network cooperation control means 906 (step S1213).

Next, on receiving the VLAN switching-completion notification, the server/network cooperation control means 906 notifies the migration daemon A907 of a process resuming-request notification (step S1214) together with a set of the actual IP address of a resuming target server and a resuming target process ID. In the embodiment, they are notified as (a2, 2000), (b2, 2000).

The migration daemon 907 releases the freeze of the motion picture delivery process 908 having the process ID "2000" in the server 901 of the Tokyo site (resumes the process) and releases the freeze of a motion picture delivery process 910 having the process ID "2000" in the server 902 of the Osaka site (resumes the process) at the same time through the migration daemon 909 (step 1215). At the time, the user 1 and the user 3 can resume reception of the streaming data from the server 901 of the Tokyo site, and the user 3 can resume reception of the streaming data from the server 902 of the Osaka site. On the completion of resuming (resumption) of the process, the migration daemon A907 issues a process resuming-completion notification to the server/network cooperation control means 906 (step S1217).

On receiving the process resuming-completion notification, the server/network cooperation control means 906 completes all the processes of the migration and issues a migration completion notification to the server 901 of the Tokyo site (step S1218).

In the series of the processes, the users temporarily lose the connection destination IP address at the time of completion of the process migration. However, they can find the connection destination IP address again before a TCP session is disconnected by that a host application detects the congestion of the network, by promptly switching the VLAN. As a result, communication can be resumed without being interrupted. Further, since switching of the VLAN is used as the means for changing the connection destination target network of the users, it is possible to provide the users with such recognition that connection is executed to the same IP (here, the virtual IP "v") at all times before and after the process migration.

Accordingly, the migration can be realized without causing the users to be aware of it as far as possible.

In the sequence, the phenomenon that the user can recognize is the following sequence.

The users 1 to 3 establish the IP address "v" of the server 901 of the Tokyo site and the TCP session and receive the streaming data from the motion picture delivery process 908.

Reception of the streaming data is temporarily interrupted (1205) as soon as the motion picture delivery process 908 is frozen (step S1204).

Next, the virtual IP address "v" is duplicated from the server 901 of the Tokyo site to the server 902 of the Osaka site (step S1207).

When the process is resumed without switching the connection destination VLAN (step S1215), the users 1 and 3 can receive the streaming data from the motion picture delivery process 908 again (step S1216).

When the VLAN to which the user 3 is connected is switched from the VLAN 1 to the VLAN 2 (step S1211), the user 2 finds the IP address "v" in the server 902 of the Osaka site (S1212), and when the process is resumed (step S1215), the user 2 can receive the streaming data from the motion picture delivery process 910 again (step S1216).

As described above, the users are not aware of that the process is migrated except the phenomenon that the streaming data cannot be received in a short period of time from step S1205 to step S1216. Further, the streaming reproduction application used by the users ordinarily has a sufficient buffer to prevent interruption of a motion picture even if communication is disconnected for the short period of time. Accordingly, the process migration can be executed without causing a user browsing the motion picture to be aware of it.

With the above arrangement, a load can be dispersed optimumly in a wide area without being affected by a sequence of connection.

The third embodiment is different from the first embodiment in that the session migration is executed when the number of users connected to the Tokyo site exceeds the threshold value and that when the process is resumed after it is duplicated, not only the process of the Osaka site but also the process of the Tokyo site are resumed simultaneously and both the processes are put in an operating status.

The invention claimed is:

1. A network system comprising:
    connection control means for controlling the switching of the connection destination of a terminal;
    first and second servers belonging to first and second different networks, respectively and connected to the terminal, respectively through the first and second networks;
    operating server-switching control means for migrating a process from the first server to the second server; and
    server/network cooperation control means having a storage unit for storing the information of the first and second servers and the information of the second network, and connected to the operating server-switching control means and to the connection control means,
    wherein the server/network cooperation control means comprises information processing means for executing processing for receiving a process migration request from the first server to the second server and sending a migration start request including the information of the second server as a migration destination stored in the storage unit to the operating server-switching control means, and processing for receiving a target process migration completion notification from the operating server-switching control means and, thereafter, sending a switching request from the first network to the second network to the connection control means, the switching request including the information of the second network stored in the storage unit, and
    the connection control means and the first and second servers execute communication using a transport level protocol.

2. The network system according to claim 1, wherein the operating server-switching control means is included in at least one of the first and second servers.

3. A process migration method between networks of a network system which comprises:
    connection control means for controlling the switching of the connection destination of a terminal;
    first and second servers belonging to first and second different networks, respectively and connected to the terminal, respectively through the first and second networks;
    operating server-switching control means for migrating a process from the first server to the second server; and
    server/network cooperation control means connected to the operating server-switching control means and to the connection control means, and
    in which the connection control means and the first and second servers execute communication using a transport level protocol,
    wherein the process migration method comprises:
    a first step at which the server/network cooperation control means receives a process migration request from the first server to the second server, and sends a migration start request including the information of the second server as a migration destination to the operating server-switching control means;
    a second step at which the operating server-switching control means migrates a target process from the first server to the second server on receiving the migration start request;
    a third step at which the server/network cooperation control means receives a process migration completion notification from the operating server-switching control means and, thereafter, sends a switching request from the first network to the second network to the connection control means, the switching request including the information of the second network; and
    a fourth step at which the connection control means switches a target network from the first network to the second network.

4. The process migration method between networks according to claim 3, wherein the target process is put in a pause status before it is migrated to the second server at the second step, and process migration method further comprises a fifth step at which the pause status of the target process migrated between the servers is released after the fourth step.

5. The process migration method between networks according to claim 3, wherein a shiftable connection destination identifier is shifted to the second server at the second step.

6. A server/network cooperation control device used in a network system, the network system comprising:
    connection control means for controlling the switching of the connection destination of a terminal;
    first and second servers belonging to first and second different networks, respectively and connected to the terminal, respectively through the first and second networks; and
    operating server-switching control means for migrating a process from the first server to the second server, and in which the connection control means and the first and second servers execute communication using a transport level protocol,
wherein the server/network cooperation control device is connected to the operating server-switching control means and the connection control means, and comprises:
a storage unit for storing the information of the first and second servers and the information of the second network; and
information processing means for executing processing for receiving a process migration request from the first server to the second server and sending a migration start request including the information of the second server as a migration destination stored in the storage unit to the operating server-switching control means, and processing for receiving a target process migration completion notification from the operating server-switching control means and, thereafter, sending a switching request from the first network to the second network to the connection control means, the switching request including the information of the second network stored in the storage unit.

7. A computer readable storage medium storing a computer program of a server/network cooperation control computer used in a network system, the network system comprising:
connection control means for controlling the switching of the connection destination of a terminal;
first and second servers belonging to first and second different networks, respectively and connected to the terminal, respectively through the first and second networks; and
operating server-switching control means for migrating a process from the first server to the second server, and
in which the connection control means and the first and second servers execute communication using a transport level protocol
wherein the computer is connected to the operating server-switching control means and the connection control means, and
wherein the program includes instructions for causing the computer to execute:
(1) processing for receiving a process migration request from the first server to the second server and sending a migration start request including the information of the second server as a migration destination stored in a storage unit of the computer to the operating server-switching control means; and
(2) processing for receiving a target process migration completion notification from the operating server-switching control means and, thereafter, sending a switching request from the first network to the second network to the connection control means, the switching request including the information of the second network stored in the storage unit.

8. A network system comprising:
connection control unit for controlling the switching of the connection destination of a terminal;
first and second servers belonging to first and second different networks, respectively and connected to the terminal, respectively through the first and second networks;
operating server-switching control unit for migrating a process from the first server to the second server; and
server/network cooperation control unit having a storage unit for storing the information of the first and second servers and the information of the second network, and connected to the operating server-switching control unit and to the connection control unit,
wherein the server/network cooperation control unit comprises information processing unit for executing processing for receiving a process migration request from the first server to the second server and sending a migration start request including the information of the second server as a migration destination stored in the storage unit to the operating server-switching control unit, and processing for receiving a target process migration completion notification from the operating server-switching control unit and, thereafter, sending a switching request from the first network to the second network to the connection control unit, the switching request including the information of the second network stored in the storage unit, and
the connection control unit and the first and second servers execute communication using a transport level protocol.

9. A process migration method between networks of a networks system which comprises:
connection control unit for controlling the switching of the connection destination of a terminal;
first and second servers belonging to first and second different networks, respectively and connected to the terminal, respectively through the first and second networks;
operating server-switching control unit for migrating a process from the first server to the second server; and
server/network cooperation control unit connected to the operating server-switching control unit and to the connection control unit, and
in which the connection control unit and the first and second servers execute communication using a transport level protocol,
wherein the process migration method comprises:
a first step at which the server/network cooperation control unit receives a process migration request from the first server to the second server, and sends a migration start request including the information of the second server as a migration destination to the operating server-switching control unit;
a second step at which the operating server-switching control unit migrates a target process from the first server to the second server on receiving the migration start request;
a third step at which the server/network cooperation control unit receives a process migration completion notification from the operating server-switching control unit and, thereafter, sends a switching request from the first network to the second network to the connection control unit, the switching request including the information of the second network; and
a fourth step at which the connection control unit switches a target network from the first network to the second network.

* * * * *